US012700948B2

(12) United States Patent
Park et al.

(10) Patent No.: US 12,700,948 B2
(45) Date of Patent: Aug. 4, 2026

(54) FRAME STRUCTURE SUITABLE FOR TERAHERTZ-BAND-BASED COMMUNICATION ENVIRONMENT

(71) Applicant: SAMSUNG ELECTRONICS CO., LTD., Suwon-si (KR)

(72) Inventors: Yosub Park, Suwon-si (KR); Hyojin Lee, Suwon-si (KR); Hanjin Kim, Suwon-si (KR); Seunghyun Lee, Suwon-si (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 488 days.

(21) Appl. No.: 18/256,609

(22) PCT Filed: Dec. 7, 2021

(86) PCT No.: PCT/KR2021/018480
§ 371 (c)(1),
(2) Date: Jun. 8, 2023

(87) PCT Pub. No.: WO2022/124770
PCT Pub. Date: Jun. 16, 2022

(65) Prior Publication Data
US 2024/0106566 A1    Mar. 28, 2024

(30) Foreign Application Priority Data
Dec. 11, 2020    (KR) ........................ 10-2020-0173438

(51) Int. Cl.
*H04L 1/1822*    (2023.01)
*H04L 1/00*    (2006.01)
*H04L 27/26*    (2006.01)

(52) U.S. Cl.
CPC ............ *H04L 1/003* (2013.01); *H04L 1/0027* (2013.01); *H04L 27/26025* (2021.01); *H04L 27/2605* (2013.01)

(58) Field of Classification Search
CPC . H04L 1/003; H04L 1/0027; H04L 27/26025; H04L 27/2605; H04L 1/0003;
(Continued)

(56) References Cited

U.S. PATENT DOCUMENTS 8,165,588 B2    4/2012   Yu et al.
10,034,282 B2    7/2018   Kim et al.
(Continued)

FOREIGN PATENT DOCUMENTS

KR            101485977 B1      1/2015
KR            20170031183 A     3/2017
(Continued)

OTHER PUBLICATIONS

D. Lee, A. Davydov, B. Mondal, G. Xiong, G. Morozov and J. Kim, "From sub-Terahertz to Terahertz: challenges and Design Considerations," 2020 IEEE Wireless Communications and Networking Conference Workshops (WCNCW), Seoul, Korea (South), 2020, pp. 1-8, doi: 10.1109/WCNCW48565.2020.9124764. (Year: 2020).*
(Continued)

*Primary Examiner* — Ayman A Abaza
*Assistant Examiner* — Tracy L Williams

(57)            ABSTRACT

A 5G or 6G communication system is described for supporting a data transmission rate higher than that of a 4G communication system, such as LTE, and includes a base station of a communication system confirms a subcarrier spacing in which a signal is to be transmitted to or received from a terminal, transmits, to the terminal, a signal including information that indicates the allocation of additional symbols and/or the number of additional symbols, generates data
(Continued)

allocation information for data on the basis of the allocation of the additional symbols, and transmits the data allocation information and the data to the terminal, wherein the additional symbols can be allocated to the predetermined part of a first slot at every 0.5 ms of boundary.

12 Claims, 28 Drawing Sheets

(58) Field of Classification Search
CPC ... H04L 1/1822; H04L 1/0026; H04L 1/0031;
H04L 1/1819; H04L 27/2602; H04L
5/0053; H04L 5/0094; H04L 27/2666;
H04L 5/0007; H04L 27/26; H04L 1/0023;
H04W 72/0446
USPC .......................................................... 370/329
See application file for complete search history.

(56) References Cited

U.S. PATENT DOCUMENTS

| | | | |
|---|---|---|---|
| 10,868,702 B2 | 12/2020 | Park et al. | |
| 11,039,417 B2 | 6/2021 | Tabet et al. | |
| 11,044,677 B2 | 6/2021 | Ryu et al. | |
| 11,375,511 B2 | 6/2022 | Jung et al. | |
| 2018/0091267 A1 | 3/2018 | Kim et al. | |
| 2018/0295005 A1 | 10/2018 | Baldemair et al. | |
| 2019/0141700 A1* | 5/2019 | Kwak | H04L 5/0026 |
| 2019/0182829 A1 | 6/2019 | Choi | |
| 2019/0306855 A1 | 10/2019 | Tiirola et al. | |
| 2019/0386862 A1 | 12/2019 | Islam et al. | |
| 2021/0135918 A1* | 5/2021 | Zewail | H04L 5/0044 |
| 2021/0211920 A1* | 7/2021 | Balasubramanian | H04W 72/51 |
| 2021/0258891 A1* | 8/2021 | Papasakellariou .. | H04W 52/346 |
| 2022/0240320 A1* | 7/2022 | Zhang | H04W 74/0866 |

FOREIGN PATENT DOCUMENTS

| | | |
|---|---|---|
| KR | 20180033442 A | 4/2018 |
| KR | 20180034169 A | 4/2018 |
| KR | 20180045099 A | 5/2018 |
| KR | 20180091240 A | 8/2018 |
| KR | 20180122868 A | 11/2018 |
| KR | 20190018390 A | 2/2019 |
| KR | 20190038164 A | 4/2019 |
| KR | 102040616 B1 | 11/2019 |
| WO | 2018059407 A1 | 4/2018 |

OTHER PUBLICATIONS

International Search Report and Written Opinion of the International Searching Authority dated Feb. 25, 2022, in connection with International Application No. PCT/KR2021/018480, 10 pages.
Qualcomm Incorporated et al., "WF on Numerology Comparison," 3GPP TSG RAN WG1 Meeting #84bis R1-163715, Busan, Korea, Apr. 11-15, 2016, 6 pages.
Intel Corporation, "Numerology for new radio interface," 3GPP TSG RAN WG1 Meeting #84bis R1-162386, Busan, Korea, Apr. 11-15, 2016, 6 pages.
3GPP TS 38.213 V15.6.0 (Jun. 2019) Technical Specification; 3rd Generation Partnership Project; Technical Specification Group Radio Access Network; NR; Physical layer procedures for control (Release 15); 107 pages.
3GPP TS 38.331 V15.3.0 (Sep. 2018) Technical Specification; 3rd Generation Partnership Project; Technical Specification Group Radio Access Network; NR; Radio Resource Control (RRC) protocol specification (Release 15); 446 pages.
3GPP TS 38.211 V16.2.0 (Jun. 2020) Technical Specification; 3rd Generation Partnership Project; Technical Specification Group Radio Access Network; NR; Physical channels and modulation (Release 16); 131 pages.
3GPP TS 36.331 V16.12.0 (Mar. 2023); Technical Specification; 3rd Generation Partnership Project; Technical Specification Group Radio Access Network; Evolved Universal Terrestrial Radio Access (E-UTRA); Radio Resource Control (RRC); Protocol specification (Release 16); 1096 pages.
Supplementary European Search Report dated Apr. 17, 2024, in connection with European Patent Application No. 21903816.3, 8 pages.
Ericsson, "On extended CPs", R1-1609642, TSG-RAN WG1 #86bis, Lisbon, Portugal, Oct. 2016, 2 pages.
Office Action dated Jan. 7, 2026, in connection with Korean Application No. 10-2020-0173438, 7 pages.
Office Action issued Apr. 3, 2026, in connection with China Patent Application No. 202180080675.X, 16 pages.

* cited by examiner

Control resource set duration
(404)

Subband (403)

System bandwidth (410)

Slot (420)

Frequency

Time control resource set#1 (401)

control resource set#2 (402)

1 RB
= 12 subcarriers 1 subcarrier
with subcarrier spacing
Δf

PDCCH REs (501)

DMRS REs (502)

PDSCH REs (503)

1 Slot (or Subframe)
= 14 OFDM symbols 1 ms 0.5 ms slot 0 ... slot 127

710

Symbol 0 ... Symbol 13

720

First symbol (720)

CP | Data 539.1 ns (67.4%) | 260.4 ns

722 | 724

Normal symbol (730)

CP | Data 18.3 ns (6.57%) | 260.4 ns

732 | 734

700

256 slots in 1 ms 128 slots in 0.5 ms 14 symbols in 3.9 us 1 symbol in 278.7 ns

First symbol for the every 0.5 ms

Normal Symbol (548 samples)

FIG. 16

| Subcarrier spacing [kHz] | 2880 | | | | 3072 | | | | 3200 | | | |
|---|---|---|---|---|---|---|---|---|---|---|---|---|
| Factorization of subcarrier spacing [Hz] | $2^6 3^2 5 \times 1000$ ($2^5 3 \times 15$ kHz) | | | | $2^{10} 3 \times 1000$ ($\frac{2^{10}}{5} \times 15$ kHz) | | | | $2^7 5^2 \times 1000$ ($\frac{2^7 5}{3} \times 15$ kHz/syu) | | | |
| Symbol length(s) including normal CP | 3.69E-07 | 3.69E-07 | 3.70E-07 | 3.70E-07 | 3.46E-07 | 3.46E-07 | 3.47E-07 | 3.47E-07 | 3.33E-07 | 3.33E-07 | 3.36E-07 | 3.36E-07 |
| Symbol length(s) including extended CP | 3.91E-07 | 3.92E-07 | 3.88E-07 | 3.97E-07 | 3.66E-07 | 3.67E-07 | 3.72E-07 | 3.74E-07 | 3.57E-07 | 3.59E-07 | 3.54E-07 | 3.59E-07 |
| Data part length(s) in one symbol | 3.47E-07 | 3.47E-07 | 3.47E-07 | 3.47E-07 | 3.26E-07 | 3.26E-07 | 3.26E-07 | 3.26E-07 | 3.13E-07 | 3.13E-07 | 3.13E-07 | 3.13E-07 |
| Normal CP length(s) in one symbol (number of samples of normal CP) | 2.17E-08 [32] | 2.17E-08 [32] | 2.31E-08 [34] | 2.31E-08 [34] | 2.03E-08 [32] | 2.03E-08 [32] | 2.16E-08 [34] | 2.16E-08 [34] | 2.08E-08 [34] | 2.08E-08 [34] | 2.38E-08 [39] | 2.38E-08 [39] |
| Extended CP length(s) in one symbol (number of samples of extended CP) | 4.34E-08 [64] | 4.48E-08 [66] | 4.07E-08 [60] | 4.95E-08 [73] | 4.07E-08 [64] | 4.20E-08 [66] | 4.64E-08 [73] | 4.83E-08 [76] | 4.46E-08 [73] | 4.64E-08 [76] | 4.15E-06 [68] | 4.70E-06 [77] |
| Normal CP overhead [%/100] | 0.058824 | 0.058824 | 0.062271 | 0.062271 | 0.058824 | 0.058824 | 0.062271 | 0.062271 | 0.062271 | 0.062271 | 0.07078 | 0.07078 |
| extended CP overhead [%/100] | 0.111111 | 0.114187 | 0.104895 | 0.124786 | 0.111111 | 0.114187 | 0.124786 | 0.129252 | 0.124786 | 0.129252 | 0.117241 | 0.13073 |
| Number of symbols with normal CP per slot | 18 | 17 | 22 | 15 | 18 | 17 | 15 | 14 | 15 | 14 | 20 | 31 |
| Number of symbols with extended CP per slot | 17 | 16 | 21 | 14 | 17 | 16 | 14 | 13 | 14 | 13 | 19 | 29 |
| Slot length(s) | 6.64E-06 | 6.27E-06 | 8.15E-06 | 5.55E-06 | 6.23E-06 | 5.88E-06 | 5.21E-06 | 4.86E-06 | 5.00E-06 | 4.67E-06 | 6.73E-06 | 1.04E-05 |

FFT_Size: 512 (number of data symbol samples: 512)

FIG. 17

|  | Symbol including extended CP | Symbol including normal CP |
|---|---|---|
| Subcarrier spacing [kHz] | 2700 | 2700 |
| Number of symbols per slot | 15 | 16 |
| Factorization of subcarrier spacing [Hz] | 2700 | |
| Number of slots packed in 1 ms | 160 | |
| Slot length [us] | 6.25 | |
| CP overhead [%] | 11.11 | 5.18 |
| Number of CP samples | 64 | 28 |
| Symbol length(s) including CP | 4.17E-07 | 3.91E-07 |
| Data part length(s) in one symbol | 3.70E-07 | 3.70E-07 |
| CP length(s) | 4.63E-08 | 2.03E-08 |

FFT_Size: 512 (number of data symbol samples: 512)

FIG. 18

| Number of symbols per slot | 9 | | | | | | | | |
|---|---|---|---|---|---|---|---|---|---|
| Subcarrier spacing [kHz] | 2430000 | 2592000 | 2700000 | 2916000 | 3240000 | 3375000 | 3645000 | 3645000 | 4050000 |
| Number of slots packed in 1 ms | 256 | 256 | 256 | 288 | 320 | 320 | 360 | 384 | 384 |
| CP overhead [%/100] | 0.0518518152 | 0.111111 | 0.146667 | 0.1111111 | 0.1111111 | 0.146667 | 0.111111 | 0.051852 | 0.146667 |
| Number of CP samples | 28 | 64 | 88 | 64 | 64 | 88 | 64 | 28 | 88 |
| Symbol length[s] including CP | 4.34E-07 | 4.34E-07 | 4.34E-07 | 3.86E-07 | 3.47E-07 | 3.47E-07 | 3.09E-07 | 2.89E-07 | 2.89E-07 |
| Data part length[s] in one symbol | 4.12E-07 | 3.86E-07 | 3.70E-07 | 3.43E-07 | 3.09E-07 | 2.96E-07 | 2.74E-07 | 2.74E-07 | 2.47E-07 |
| CP length[s] | 2.25E-08 | 4.82E-08 | 6.37E-08 | 4.29E-08 | 3.86E-08 | 5.09E-08 | 3.43E-08 | 1.50E-08 | 4.24E-08 |

FIG. 19

| Number of symbols per slot | | 10 | | | | | | | | | | | | | | | |
|---|---|---|---|---|---|---|---|---|---|---|---|---|---|---|---|---|---|
| Subcarrier spacing [kHz] | 1875000 | 2025000 | 2025000 | 2160000 | 2250000 | 2430000 | 2700000 | 2700000 | 2880000 | 3000000 | 3125000 | 3240000 | 3375000 | 3375000 | 3750000 | 3645000 | 4050000 |
| Number of slots packed in 1 ms | 160 | 180 | 192 | 192 | 192 | 216 | 240 | 256 | 256 | 256 | 256 | 288 | 288 | 300 | 320 | 324 | 360 |
| CP overhead [%/100] | 0.146666667 | 0.111111 | 0.051852 | 0.111111 | 0.146666667 | 0.111111 | 0.111111 | 0.051852 | 0.111111 | 0.146667 | 0.1808 | 0.111111 | 0.146667 | 0.111111 | 0.146667 | 0.111111 | 0.111111 |
| Number of CP samples | 88 | 84 | 28 | 64 | 88 | 64 | 64 | 28 | 64 | 88 | 113 | 64 | 88 | 64 | 88 | 64 | 64 |
| Symbol length[s] including CP | 6.25E-07 | 5.56E-07 | 5.21E-07 | 5.21E-07 | 5.21E-07 | 4.63E-07 | 4.17E-07 | 3.91E-07 | 3.91E-07 | 3.91E-07 | 3.91E-07 | 3.47E-07 | 3.47E-07 | 3.33E-07 | 3.13E-07 | 3.09E-07 | 2.78E-07 |
| Data part length[s] in one symbol | 5.33E-07 | 4.94E-07 | 4.94E-07 | 4.63E-07 | 4.44E-07 | 4.12E-07 | 3.70E-07 | 3.70E-07 | 3.47E-07 | 3.33E-07 | 3.20E-07 | 3.09E-07 | 2.96E-07 | 2.96E-07 | 2.67E-07 | 2.74E-07 | 2.47E-07 |
| CP length[s] | 9.17E-08 | 6.17E-07 | 2.70E-08 | 5.79E-08 | 7.64E-08 | 5.14E-08 | 4.63E-08 | 2.03E-08 | 4.34E-08 | 5.73E-08 | 7.06E-08 | 3.86E-08 | 5.09E-08 | 3.70E-08 | 4.58E-08 | 3.43E-08 | 3.09E-08 |

FIG. 20

| number of symbols per slot | 12 | | | | | | | | | | | | | |
|---|---|---|---|---|---|---|---|---|---|---|---|---|---|---|
| subcarrier spacing | 2025000 | 2160000 | 2250000 | 2187000 | 2430000 | 2430000 | 2592000 | 2700000 | 3240000 | 3375000 | 3375000 | 3240000 | 3456000 | 3750000 |
| chip duration | 9.88E-10 | 9.04E-10 | 8.68E-10 | 8.93E-10 | 8.04E-10 | 8.04E-10 | 7.54E-10 | 7.23E-10 | 6.03E-10 | 5.79E-10 | 5.79E-10 | 6.03E-10 | 5.65E-10 | 5.21E-10 |
| number of slot per 1ms | 160 | 160 | 160 | 162 | 180 | 192 | 192 | 192 | 240 | 240 | 250 | 256 | 256 | 256 |
| cp overhead | 0.091851852 | 0.111111 | 0.148667 | 0.111111111 | 0.111111111 | 0.051852 | 0.111111 | 0.148667 | 0.111111 | 0.148667 | 0.111111111 | 0.051185 | 0.111111 | 0.1808 |
| number of cp samples | 28 | 64 | 68 | 64 | 64 | 28 | 64 | 68 | 64 | 68 | 64 | 28 | 64 | 113 |
| symbol plus cp length | 5.21E-07 | 5.21E-07 | 5.21E-07 | 5.14E-07 | 4.63E-07 | 4.34E-07 | 4.34E-07 | 4.34E-07 | 3.47E-07 | 3.47E-07 | 3.33E-07 | 3.26E-07 | 3.26E-07 | 3.26E-07 |
| symbol length | 4.94E-07 | 4.63E-07 | 4.44E-07 | 4.57E-07 | 4.12E-07 | 4.12E-07 | 3.86E-07 | 3.70E-07 | 3.09E-07 | 2.96E-07 | 2.96E-07 | 3.09E-07 | 2.89E-07 | 2.67E-07 |
| cp length | 2.70E-08 | 5.79E-08 | 7.64E-08 | 5.72E-08 | 5.14E-08 | 2.29E-08 | 4.82E-08 | 6.37E-08 | 3.86E-08 | 5.09E-08 | 3.70E-08 | 1.69E-08 | 3.62E-08 | 5.89E-08 |

FIG. 21

| number of symbols per slot | 15 | | | | | | | |
|---|---|---|---|---|---|---|---|---|
| subcarrier spacing | 2700000 | 3375000 | 3375000 | 3645000 | 4050000 | 4050000 | 4320000 | 4500000 |
| chip duration | 7.23E-10 | 5.79E-10 | 5.79E-10 | 5.36E-10 | 4.82E-10 | 4.82E-10 | 4.52E-10 | 4.34E-10 |
| number of slot per 1ms | 160 | 192 | 200 | 216 | 240 | 256 | 256 | 256 |
| cp overhead | 0.111111111 | 0.146667 | 0.111111 | 0.111111 | 0.111111 | 0.051852 | 0.111111 | 0.146667 |
| number of cp samples | 64 | 88 | 64 | 64 | 64 | 28 | 64 | 88 |
| symbol plus cp length | 4.17E-07 | 3.47E-07 | 3.33E-07 | 3.09E-07 | 2.78E-07 | 2.60E-07 | 2.60E-07 | 2.60E-07 |
| symbol length | 3.70E-07 | 2.96E-07 | 2.96E-07 | 2.74E-07 | 2.47E-07 | 2.47E-07 | 2.31E-07 | 2.22E-07 |
| cp length | 4.63E-08 | 5.09E-08 | 3.70E-08 | 3.43E-08 | 3.09E-08 | 1.35E-08 | 2.89E-08 | 3.82E-08 |

FIG. 22

| number of symbols per slot | 16 | | | | | | | | | | | | | | | | |
|---|---|---|---|---|---|---|---|---|---|---|---|---|---|---|---|---|---|
| subcarrier spacing | 2430000 | 2592000 | 2700000 | 2700000 | 2700000 | 2880000 | 3000000 | 3125000 | 2916000 | 3240000 | 3375000 | 3240000 | 3456000 | 3750000 | 3750000 | 3645000 | 4050000 |
| chip duration | 8.04E-10 | 7.54E-10 | 7.23E-10 | 7.23E-10 | 7.23E-10 | 6.78E-10 | 6.51E-10 | 6.25E-10 | 6.70E-10 | 6.03E-10 | 5.79E-10 | 6.03E-10 | 5.65E-10 | 5.21E-10 | 5.21E-10 | 5.36E-10 | 4.82E-10 |
| number of slot per 1ms | 144 | 144 | 144 | 150 | 160 | 160 | 160 | 160 | 162 | 180 | 180 | 192 | 192 | 192 | 200 | 216 | 216 |
| cp overhead | 0.851851852 | 0.111111 | 0.146667 | 0.1111111 | 0.05185 | 0.111111 | 0.146667 | 0.1000 | 0.111111 | 0.111111 | 0.146667 | 0.051852 | 0.111111 | 0.1000 | 0.146667 | 0.051852 | 0.146667 |
| number of cp samples | 28 | 64 | 88 | 64 | 28 | 64 | 88 | 113 | 64 | 64 | 88 | 28 | 64 | 113 | 88 | 88 | 88 |
| symbol plus cp length | 4.34E-07 | 4.34E-07 | 4.34E-07 | 4.17E-07 | 3.91E-07 | 3.91E-07 | 3.91E-07 | 3.91E-07 | 3.86E-07 | 3.47E-07 | 3.47E-07 | 3.28E-07 | 3.28E-07 | 3.28E-07 | 3.13E-07 | 2.89E-07 | 2.89E-07 |
| symbol length | 4.12E-07 | 3.86E-07 | 3.70E-07 | 3.70E-07 | 3.70E-07 | 3.47E-07 | 3.33E-07 | 3.20E-07 | 3.43E-07 | 3.09E-07 | 2.96E-07 | 3.09E-07 | 2.89E-07 | 2.67E-07 | 2.67E-07 | 2.74E-07 | 2.47E-07 |
| cp length | 2.23E-08 | 4.82E-08 | 6.37E-08 | 4.63E-08 | 2.03E-08 | 4.34E-08 | 5.73E-08 | 7.06E-08 | 4.29E-08 | 3.86E-08 | 5.09E-08 | 1.69E-08 | 3.62E-08 | 5.89E-08 | 4.58E-08 | 1.50E-08 | 4.24E-08 |

FIG. 23

| number of symbols per slot | 18 | | | | | | | | | | |
|---|---|---|---|---|---|---|---|---|---|---|---|
| subcarrier spacing | 2430000 | 2430000 | 2592000 | 2700000 | 2916000 | 3240000 | 3375000 | 3645000 | 3645000 | 4050000 | 4050000 |
| chip duration | 8.04E-10 | 8.04E-10 | 7.54E-10 | 7.23E-10 | 6.70E-10 | 6.03E-10 | 5.79E-10 | 5.36E-10 | 5.36E-10 | 4.82E-10 | 4.82E-10 |
| number of slot per 1ms | 120 | 128 | 128 | 128 | 144 | 160 | 160 | 180 | 192 | 192 | 200 |
| cp overhead | 0.111111111 | 0.051852 | 0.111111 | 0.1466667 | 0.111111 | 0.111111 | 0.146667 | 0.111111 | 0.051852 | 0.146667 | 0.111111 |
| number of cp samples | 64 | 28 | 64 | 88 | 64 | 64 | 88 | 64 | 28 | 88 | 64 |
| symbol plus cp length | 4.63E-07 | 4.34E-07 | 4.34E-07 | 4.34E-07 | 3.86E-07 | 3.47E-07 | 3.47E-07 | 3.09E-07 | 2.89E-07 | 2.89E-07 | 2.78E-07 |
| symbol length | 4.12E-07 | 4.12E-07 | 3.86E-07 | 3.70E-07 | 3.43E-07 | 3.09E-07 | 2.96E-07 | 2.74E-07 | 2.74E-07 | 2.47E-07 | 2.47E-07 |
| cp length | 5.14E-08 | 2.25E-08 | 4.82E-08 | 6.37E-08 | 4.29E-08 | 3.86E-08 | 5.09E-08 | 3.43E-08 | 1.50E-08 | 4.24E-08 | 3.009E-08 |

FIG. 24

| number of symbols per slot | 20 | | | | | | | | | | | |
|---|---|---|---|---|---|---|---|---|---|---|---|---|
| subcarrier spacing | 2430000 | 2700000 | 2700000 | 2880000 | 3000000 | 3125000 | 3240000 | 3375000 | 3375000 | 3750000 | 3645000 | 4050000 |
| chip duration | 8.04E-10 | 7.23E-10 | 7.23E-10 | 6.78E-10 | 6.51E-10 | 6.25E-10 | 6.03E-10 | 5.79E-10 | 5.79E-10 | 5.21E-10 | 5.36E-10 | 4.82E-10 |
| number of slot per 1ms | 108 | 120 | 128 | 128 | 128 | 128 | 144 | 144 | 150 | 160 | 162 | 180 |
| cp overhead | 0.11111111 | 0.111111 | 0.051852 | 0.11111111 | 0.1466667 | 0.1808 | 0.146667 | 0.111111 | 0.111111 | 0.146667 | 0.111111 | 0.111111 |
| number of cp samples | 64 | 64 | 28 | 64 | 88 | 113 | 64 | 88 | 64 | 88 | 64 | 64 |
| symbol plus cp length | 4.63E-07 | 4.17E-07 | 3.91E-07 | 3.91E-07 | 3.91E-07 | 3.91E-07 | 3.47E-07 | 3.47E-07 | 3.33E-07 | 3.13E-07 | 3.09E-07 | 2.78E-07 |
| symbol length | 4.12E-07 | 3.70E-07 | 3.70E-07 | 3.47E-07 | 3.33E-07 | 3.20E-07 | 3.09E-07 | 2.96E-07 | 2.96E-07 | 2.67E-07 | 2.74E-07 | 2.47E-07 |
| cp length | 5.14E-08 | 4.63E-08 | 2.03E-08 | 4.34E-08 | 5.73E-08 | 7.06E-08 | 3.86E-08 | 5.09E-08 | 3.70E-08 | 4.58E-08 | 3.43E-08 | 3.09E-08 |

FRAME STRUCTURE SUITABLE FOR TERAHERTZ-BAND-BASED COMMUNICATION ENVIRONMENT

CROSS-REFERENCE TO RELATED APPLICATIONS

This application is a 371 of International Application No. PCT/KR2021/018480 filed on Dec. 7, 2021, which claims priority to Korean Patent Application No. 10-2020-0173438 filed on Dec. 11, 2020, the disclosures of which are herein incorporated by reference in their entirety.

BACKGROUND

1. Field

The disclosure relates to designing a frame structure required for wireless communication in a terahertz band and an apparatus therefor.

2. Description of Related Art

A review of the development of wireless communication from generation to generation shows that the development has mostly been directed to technologies for services targeting humans, such as voice-based services, multimedia services, and data services. It is expected that connected devices which are exponentially increasing after commercialization of 5th generation (5G) communication systems will be connected to communication networks. Examples of things connected to networks may include vehicles, robots, drones, home appliances, displays, smart sensors connected to various infrastructures, construction machines, and factory equipment. Mobile devices are expected to evolve in various form factors, such as augmented reality glasses, virtual reality headsets, and hologram devices. In order to provide various services by connecting hundreds of billions of devices and things in the 6G era, there have been ongoing efforts to develop improved 6G communication systems. For these reasons, 6G communication systems are referred to as beyond-5G systems.

6G communication systems, which are expected to be implemented approximately by 2030, will have a maximum transmission rate of tera (1,000 giga)-level bps and a radio latency of 100 μsec, and thus will be 50 times as fast as 5G communication systems and have the $\frac{1}{10}$ radio latency thereof.

In order to accomplish such a high data transmission rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, a technology capable of securing the signal transmission distance (that is, coverage) will become more crucial. It is necessary to develop, as major technologies for securing the coverage, multiantenna transmission technologies including radio frequency (RF) elements, antennas, novel waveforms having a better coverage than OFDM, beamforming and massive MIMO, full dimensional MIMO (FD-MIMO), array antennas, and large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the frequency efficiencies and system networks, the following technologies have been developed for 6G communication systems: a full-duplex technology for enabling an uplink (UE transmission) and a downlink (node B transmission) to simultaneously use the same frequency resource at the same time; a network technology for utilizing satellites, high-altitude platform stations (HAPS), and the like in an integrated manner; a network structure innovation technology for supporting mobile nodes B and the like and enabling network operation optimization and automation and the like; a dynamic spectrum sharing technology though collision avoidance based on spectrum use prediction, an artificial intelligence (AI)-based communication technology for implementing system optimization by using AI from the technology design step and internalizing end-to-end AI support functions; and a next-generation distributed computing technology for implementing a service having a complexity that exceeds the limit of UE computing ability by using super-high-performance communication and computing resources (mobile edge computing (MEC), clouds, and the like). In addition, attempts have been continuously made to further enhance connectivity between devices, further optimize networks, promote software implementation of network entities, and increase the openness of wireless communication through design of new protocols to be used in 6G communication systems, development of mechanisms for implementation of hardware-based security environments and secure use of data, and development of technologies for privacy maintenance methods.

It is expected that such research and development of 6G communication systems will enable the next hyper-connected experience in new dimensions through the hyper-connectivity of 6G communication systems that covers both connections between things and connections between humans and things. Particularly, it is expected that services such as truly immersive XR, high-fidelity mobile holograms, and digital replicas could be provided through 6G communication systems. In addition, with enhanced security and reliability, services such as remote surgery, industrial automation, and emergency response will be provided through 6G communication systems, and thus these services will be applied to various fields including industrial, medical, automobile, and home appliance fields.

In addition, a technology for effective signal transmission/reception in a terahertz band is being studied.

The disclosure proposes a frame structure suitable for a terahertz band and a signal transmission/reception method using the frame structure.

In order to solve the above problem, the disclosure provides a method performed by a base station of a communication system, the method including identifying a subcarrier spacing in which a signal is to be transmitted to or received from a terminal, transmitting, to the terminal, a signal including information indicating whether an additional symbol is allocated and/or the number of additional symbols, generating data allocation information for data based on the allocation of the additional symbol, and transmitting the data allocation information and the data to the terminal, wherein the additional symbol is allocated to a predetermined location of a first slot for every 0.5 ms boundary.

Further, there is provided a method performed by a terminal of a communication system, the method including identifying a subcarrier spacing in which a signal is to be transmitted to or received from a base station, receiving a signal including information indicating at least one of whether an additional symbol is allocated or the number of additional symbols from the base station, receiving data allocation information for data from the base station, and receiving the data on the additional symbol from the base station based on the data allocation information, wherein the additional symbol is allocated to a predetermined location of a first slot for every 0.5 ms boundary.

In addition, a base station of a communication system includes a transceiver, and a controller configured to perform control to identify a subcarrier spacing in which a signal is to be transmitted to or received from a terminal, transmit a signal including information indicating at least one of whether an additional symbol is allocated or the number of additional symbols to the terminal, generate data allocation information for data based on the allocation of the additional symbols, and transmit the data allocation information and the data to the terminal, wherein the additional symbol is allocated to a predetermined location of a first slot for every 0.5 ms boundary.

In addition, a terminal of a communication system includes a transceiver, and a controller configured to perform control to identify a subcarrier spacing in which a signal is to be transmitted to or received from a base station, receive a signal including information indicating at least one of whether an additional symbol is allocated or the number of additional symbols from the base station, receive data allocation information for data from the base station, and receive the data on the additional symbol based on the data allocation information from the base station, wherein the additional symbol is allocated to a predetermined location of the first slot for every 0.5 ms boundary.

According to an embodiment of the disclosure, it is possible to transmit or receive a signal using a radio resource efficiently through a frame structure suitable for a terahertz band.

BRIEF DESCRIPTION OF THE DRAWINGS

FIG. 16 illustrates an example of a frame structure that satisfies condition A, condition B, and condition C:

FIG. 17 illustrates an example of a frame structure that satisfies condition A, condition B, condition C, and condition D;

FIG. 18 illustrates an example of a frame structure that satisfies condition A, condition C, and condition D;

FIG. 19 illustrates another example of a frame structure that satisfies condition A, condition C, and condition D;

FIG. 20 illustrates still another example of a frame structure that satisfies condition A, condition C, and condition D;

FIG. 21 illustrates yet another example of a frame structure that satisfies condition A, condition C, and condition D;

FIG. 22 illustrates a further example of a frame structure that satisfies condition A, condition C, and condition D;

FIG. 23 illustrates yet a further example of a frame structure that satisfies condition A, condition C, and condition D;

FIG. 24 illustrates still a further example of a frame structure that satisfies condition A, condition C, and condition D;

DETAILED DESCRIPTION

Figure 1:
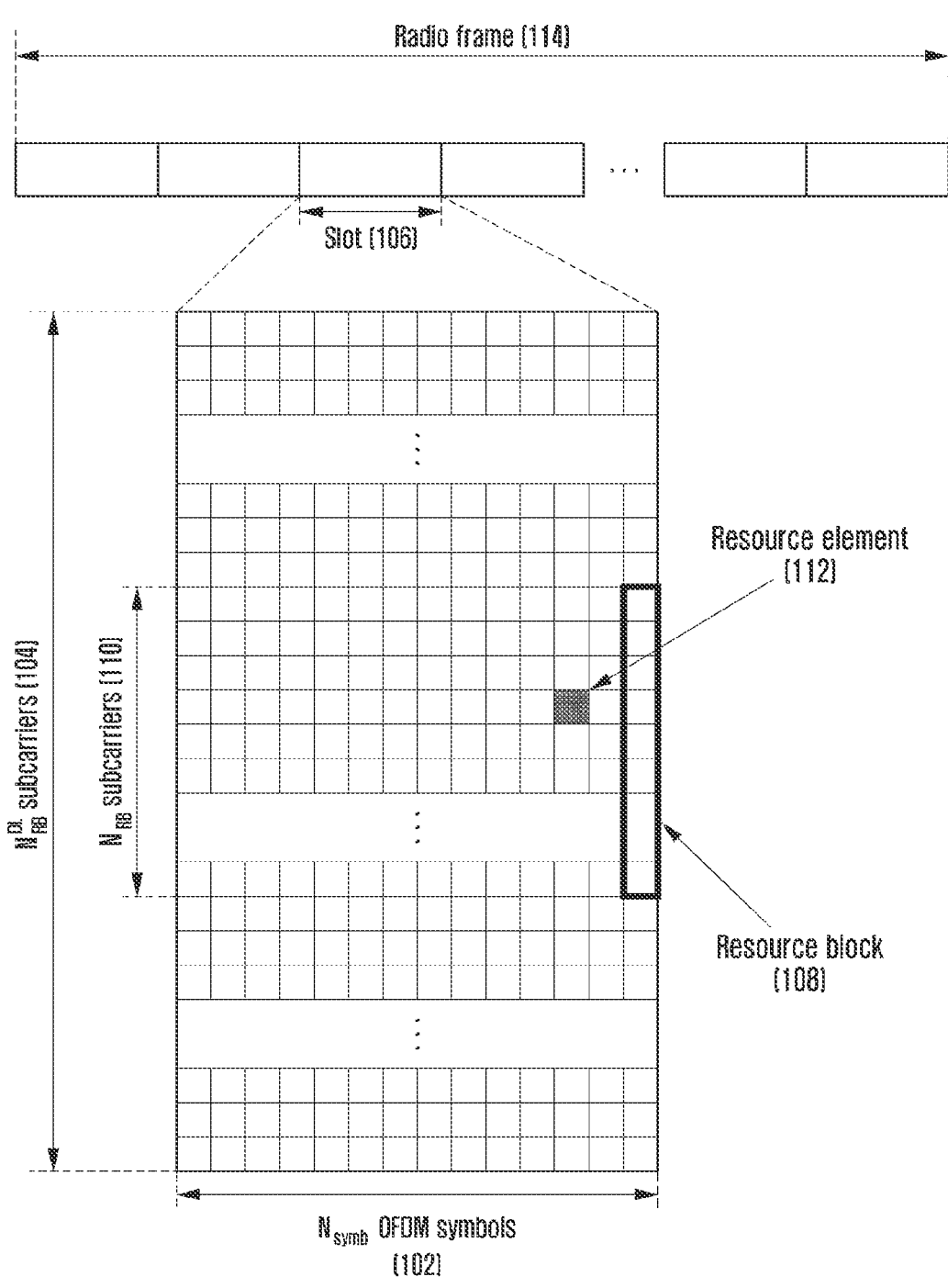
FIG. 1 illustrates a transmission structure of a time-frequency domain, which is a radio resource domain of a 5G or NR system.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) {or a mobile station (MS)} transmits data or control signals to a base station (BS) (eNode B), and the downlink indicates a radio link through which the base station transmits data or control signals to the UE. The above multiple access scheme separates data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time, such as 10 to 15 years, because it is difficult to frequently replace the battery of the UE.

Lastly, URLLC, which is a cellular-based mission-critical wireless communication service, may be used for remote control for robots or machines, industrial automation, supporting URLLC, a 5G system must provide a transmit time interval (TTI) shorter than those of other services, and also requires a design for assigning a large number of resources in a frequency band in order to secure reliability of a communication link.

The three services in the 5G system, that is, eMBB, URLLC, and mMTC, may be multiplexed and transmitted in a single system. In this case, different transmission/reception techniques and transmission/reception parameters may be used between services in order to satisfy different requirements of the respective services. Of course, the 5G is not limited to the above-described three services.

Further, research is being conducted to provide a beyond 5G system or 6G system for achieving a higher data transfer rate and ultralow latency.

FIG. 1 illustrates a transmission structure of a time-frequency domain, which is a radio resource domain of a 5G or NR system.

Referring to FIG. 1, in a radio resource domain, a horizontal axis indicates a time domain and a vertical axis indicates a frequency domain. A minimum transmission unit in the time domain is an OFDM symbol, and Nsymb OFDM symbols 122 gather to form one slot 126. The length of a subframe may be defined as 1.0 ms, and a radio frame 114 may be defined as 10 ms. A minimum transmission unit in the frequency domain is a subcarrier, and the bandwidth of the entire system transmission band may include a total of NBW subcarriers 124. However, these specific numerical values may be variably applied depending on a system.

The basic unit of the time-frequency resource domain is a resource element (RE) 112, and may be represented by an OFDM symbol index and a subcarrier index. A resource block (RB) 108 may be defined as contiguous NRB subcarriers 110 in the frequency domain.

In general, a minimum transmission unit of data is an RB unit. In 5G or NR systems, in general, Nsymb=14, NRB=12, and NBW may be proportional to the bandwidth of a system transmission band. The data rate increases in proportion to the number of RBs scheduled for a terminal. In the 5G or NR system, in the case of an FDD system configured to divide downlink and uplink by frequency, a downlink transmission bandwidth and an uplink transmission bandwidth may be different from each other. The channel bandwidth represents an RF bandwidth corresponding to a system transmission bandwidth.

In the 5G or NR system, a channel bandwidth wider than that of LTE may be employed. Table 1 is a table showing the correspondence among a system transmission bandwidth, a channel bandwidth, and a subcarrier spacing (SCS) in the 5G or NR system.

TABLE 1

| | SCS | Channel bandwidth BW$_{Channel}$ (MHz) | | | | | | | | | |
|---|---|---|---|---|---|---|---|---|---|---|---|
| | (kHz) | 5 | 10 | 15 | 20 | 25 | 40 | 50 | 60 | 80 | 100 |
| Maximum | 15 | 25 | 52 | 79 | 106 | 133 | 216 | 270 | N.A. | N.A. | N.A. |
| Transmission | 30 | 11 | 24 | 38 | 51 | 65 | 106 | 133 | 162 | 217 | 273 |
| bandwidth | 60 | N.A. | 11 | 18 | 24 | 31 | 51 | 65 | 79 | 107 | 135 |
| NRB | | | | | | | | | | | | unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services Next, downlink control information (DCI) in LTE and LTE-A systems will be described in detail.

In the LTE system, scheduling information for downlink data or uplink data is delivered from a base station to a UE through DCI. The DCI is defined in various formats, and is applied and managed as a defined DCI format depending on whether the DCI is scheduling information for uplink data or scheduling information for downlink data, whether the DCI is compact DCI having a small size of control information, whether spatial multiplexing using multiple antennas is applied, whether the DCI is DCI for power control and so on. For example, DCI format 1 which is scheduling control information for downlink data may be configured to include, at least, the following control information.

A resource allocation type 0/1 flag provides notification of whether a resource allocation method is Type 0 or Type 1. In Type 0, a resource is allocated in a resource block group (RBG) unit by applying a bitmap method. A basic unit of scheduling in the LTE system is a resource block (RB) represented as time and frequency region resources. An RBG includes a plurality of RBs and is a basic unit of scheduling in the Type 0 method. In Type 1, a specific RB is allocated within an RBG.

A resource block assignment provides notification of an RB allocated to data transmission. A represented resource is determined based on a system bandwidth and a resource allocation method.

A modulation and coding scheme (MCS) provides notification of a modulation method used for data transmission and the size of a transport block, i.e., data to be transmitted.

A hybrid automated repeat request (HARQ) process number provides notification of a process number of HARQs.

A new data indicator provides notification of a HARQ initial transmission or retransmission.

A redundancy version provides notification of a redundancy version of HARQ.

A transmit power control (TPC) command for a physical uplink control channel (PUCCH) provides notification of a TPC command for a PUCCH, i.e., an uplink control channel.

The DCI is transmitted through a PDCCH, i.e., a downlink physical control channel, according to a channel coding and modulation process.

A cyclic redundancy check (CRC) bit is added to a DCI message payload. The CRC bit is scrambled by a radio network temporary identifier (RNTI) corresponding to the identity of a UE. Different RNTIs are used depending on an object of a DCI message, for example, UE-specific data transmission, a power control command, or a random access response. That is, the RNTI is not explicitly transmitted, and is included in a CRC calculation process and transmitted. When a DCI message transmitted on a PDCCH is received, a UE may identify a CRC using an allocated RNTI. When CRC results are correct, the UE may be aware that the corresponding message has been transmitted to the UE.

Figure 2:
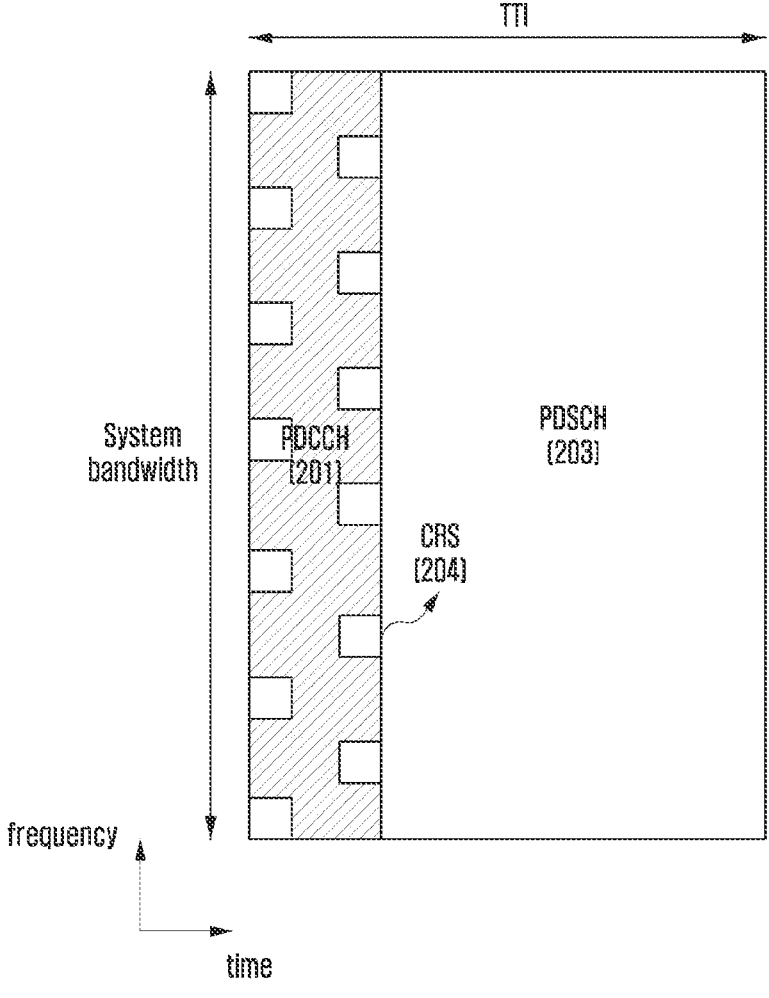
FIG. 2 illustrates a PDCCH 201 which is a downlink physical channel through which DCI of an LTE system is transmitted.

FIG. 2 illustrates a PDCCH 201 which is a downlink physical channel through which DCI of an LTE system is transmitted.

Referring to FIG. 2, a PDCCH 201 is time-multiplexed with a PDSCH 202, i.e., a data transmission channel, and is transmitted in a full system bandwidth. The region of the PDCCH 201 is represented by the number of OFDM symbols. This is indicated as a control format indicator (CFI), transmitted through a physical control format indicator channel (PCFICH), with respect to a UE. By allocating the PDCCH 201 to an OFDM symbol at the front of a subframe, the UE may decode downlink scheduling allocation information as soon as possible. Accordingly, there is an advantage in that decoding latency for a downlink-shared channel (DL-SCH), i.e., overall downlink transmission latency, can be reduced. One PDCCH carries one DCI message, and multiple UEs can be scheduled in the downlink and uplink at the same time. Accordingly, multiple PDCCHs can be transmitted within each cell at the same time. A cell-specific reference signal (CRS) 203 is used as a reference signal for the decoding of the PDCCH 201. The CRS 203 is transmitted every subframe in a full band, and scrambling and resource mapping of the CRS are different based on a cell identity (ID). The CRS 203 is a reference signal used by all UEs in common, and thus UE-specific beamforming cannot be used in the CRS. Accordingly, a multiple antenna transmission scheme for the PDCCH of the LTE system is limited to open-loop transmit diversity. A UE is implicitly notified of the number of ports of the CRS through the decoding of a physical broadcast channel (PBCH).

Resource allocation for the PDCCH 201 is based on a control-channel element (CCE). One CCE includes 9 resource element groups (REGs), that is, a total of 36 resource elements REs. The number of CCEs for the specific PDCCH 201 may be 1, 2, 4 or 8, and differ depending on the channel coding rate of the DCI message payload. As described above, different numbers of CCEs are used to implement the link adaptation of the PDCCH 201. A UE has to detect a signal in a state in which the UE is unaware of information on the PDCCH 201. In the LTE system, a search space indicative of a set of CCEs has been defined for blind decoding. A plurality of candidate sets of the search spaces are configured for each aggregation level (AL) of each CCE. This is not explicitly signaled, and is implicitly defined through a function based on a UE ID and a subframe number. A UE performs decoding on the PDCCH 201 with respect to all resource candidate groups that may be generated from CCEs within a configured search space in each subframe, and processes information declared to be valid with respect to the corresponding UE through CRC.

The search space is divided into a UE-specific search space and a common search space. UEs of a predetermined group or all the UEs may search the common search space of the PDCCH 201 in order to receive dynamic scheduling for system information or cell-common control information, such as a paging message. For example, scheduling allocation information of a DL-SCH for the transmission of a system information block (SIB)-1, including service provider information of a cell, may be received by searching the common search space of the PDCCH 201.

In the LTE system, the entire PDCCH region includes a set of CCEs in the logical region, and a search space including the set of CCEs exists therein. The search space is divided into a common search space and a UE-specific search space, and the search space for the LTE PDCCH is defined as follows.

Γ The set of PDCCH candidates to monitor are defined in terms of search spaces, where a search space $$S_k^{(L)}$$

at aggregation level $L \in \{1,2,4,8\}$ is defined by a set of PDCCH candidates. For each serving cell on which PDCCH is monitored, the CCEs corresponding to PDCCH candidate m of the search space $$S_k^{(L)}$$

are given by $$L\{(Y_k + m')\mathrm{mod}\lfloor N_{CCE,k}/L\rfloor\} + i$$

Where $Y_k$ is defined below, i=0, . . . , L−1. For the common search space m'=m. For the PDCCH UE specific search space, for the serving cell on which PDCCH is monitored, if the monitoring UE is configured with carrier indicator field then m'=m+M$^{(L)}$·n$_{Ci}$ where n$_{Ci}$ is the carrier indicator field value, else if the monitoring UE is not configured with carrier indicator field then m'=m, where m=0, . . . , M(L)−1. M(L) is the number of PDCCH candidates to monitor in the given search space.

Note that the carrier indicator field value is the same as ServCellIndex

For the common search spaces, $Y_k$ is set to 0 for the two aggregation levels L=4 and L=8.

For the UE-specific search space $$S_k^{(L)}$$

at aggregation level L, the variable $Y_k$ is defined by $$Y_k = (A \cdot Y_{k-1}) \bmod D$$

where Y−1=nRNTI≠0, A=39827, D=65537 and k=$\lfloor n_s/2 \rfloor$, ns is the slot number within a radio frame.

The RNTI value used for nRNTI is defined in subclause 7.1 in downlink and subclause 8 in uplink.⌋

A search space is a set of candidate control channels including CCEs at which a UE needs to attempt decoding on a given aggregation level. A UE has a plurality of search spaces because there are several aggregation levels in which 1, 2, 4, or 8 CCEs form one group. The number of PDCCH candidate groups that need to be monitored by a UE within a search space defined based on an aggregation level in an LTE PDCCH is defined by the following Table 2.

TABLE 2

| Type | Search space $S_k^{(L)}$ Aggregation level L | Size (in CCEs) | Number of PDCCH candidates M$^{(L)}$ |
|------|------|------|------|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Table 2, a UE-specific search space supports an aggregation level {1, 2, 4, 8}, which have {6, 6, 2, 2} PDCCH candidate groups, respectively. A common search space 320 supports an aggregation level {4, 8}, which have {4, 2} PDCCH candidate groups, respectively. The reason for which the common search space supports the aggregation level {4, 8} only is to yield better coverage characteristics because in general, a system message should reach up to a cell edge.

DCI transmitted in the common search space may be defined in only specific DCI formats, such as 0/1A/3/3A/1C corresponding to uses for a system message or power control of a UE group. A DCI format having spatial multiplexing is not supported in the common search space. A downlink DCI format to be decoded in a UE-specific search space is different based on a transmission mode configured in a corresponding UE. An accurate subframe number regarding when a corresponding configuration will be effective with respect to a corresponding UE has not been designated because the configuration of a transmission mode is performed through radio resource control (RRC) signaling. Accordingly, a UE may operate to maintain communication by always performing decoding on the DCI format 1A regardless of a transmission mode.

In the above, the method and search space of the downlink control channel and downlink control information in the conventional LTE and LTE-A systems have been described.

In the following, a downlink control channel in the 5G communication system currently being discussed will be described in detail.

Figure 3:
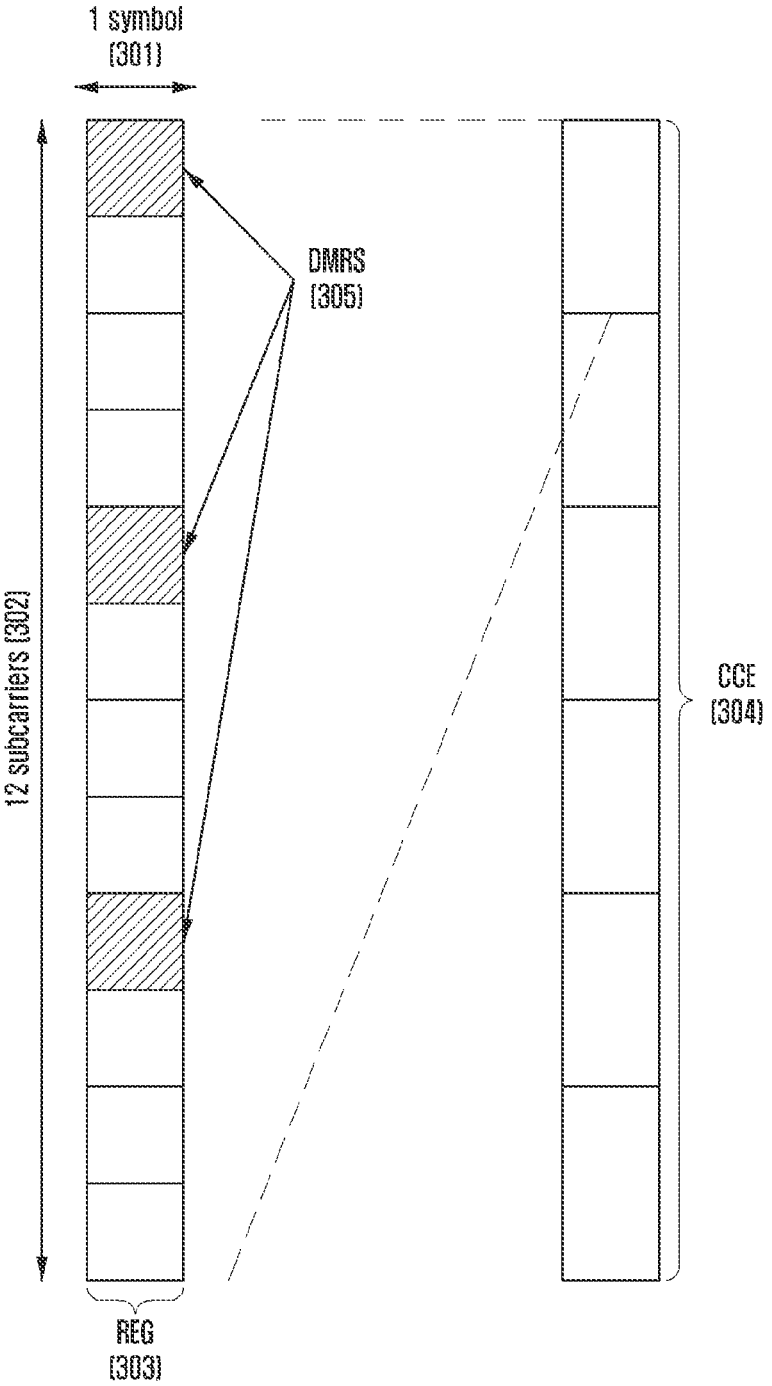
FIG. 3 illustrates an example of a basic unit of time and frequency resources configuring a downlink control channel which can be used in a 5G system.

FIG. 3 illustrates an example of a basic unit of time and frequency resources configuring a downlink control channel which may be used in a 5G system. Referring to FIG. 3, a basic unit (REG) of time and frequency resources configuring a control channel includes one OFDM symbol 301 in a time axis and 12 subcarriers 302, that is, 1 RB, in a frequency axis. In configuring the REG of the control channel, the REG of the time axis is assumed to be the 1 OFDM symbol 301 and thus a data channel and a control channel may be time-multiplexed within one subframe. In addition, a latency time requirement can easily be satisfied because the processing time of a user is reduced by positioning a control channel ahead of a data channel. Frequency multiplexing between a control channel and a data channel can be efficiently performed by configuring the REG of the frequency axis of the control channel as the 1 RB 302.

Control channel regions of various sizes may be configured by connecting a REG 303 shown in FIG. 3. For example, when a basic unit by which a downlink control channel is allocated in the 5G system is a CCE 304, one CCE 304 may include multiple REGs 303. When describing the REG 304 shown in FIG. 3 as an example, the REG 303 may include 12 REs and when one CCE 304 includes 6 REGs 303, the one CCE 304 may include 72 REs. When a downlink control region is configured, the corresponding region may include multiple CCEs 304. A specific downlink control channel may be mapped to one or multiple CCEs 304 based on an aggregation level within a control region and transmitted. The CCEs 304 within the control region may be distinguished based on a number. In this case, the number may be assigned according to a logical mapping method.

A basic unit of the downlink control channel shown in FIG. 3, that is, i.e., the REG 303 may include all regions in which REs to which DCI is mapped and a demodulation reference signal (DMRS) 305, that is, a reference signal for decoding the REs, are mapped. As shown in FIG. 3, the DMRS 305 may be transmitted in 6 REs within one REG 303. For reference, since the DMRS 303 is transmitted using the same precoding as that of a control signal mapped in the REG 303, a UE may decode the control information even if there is no information about which precoding is applied by a base station.

Figure 4:
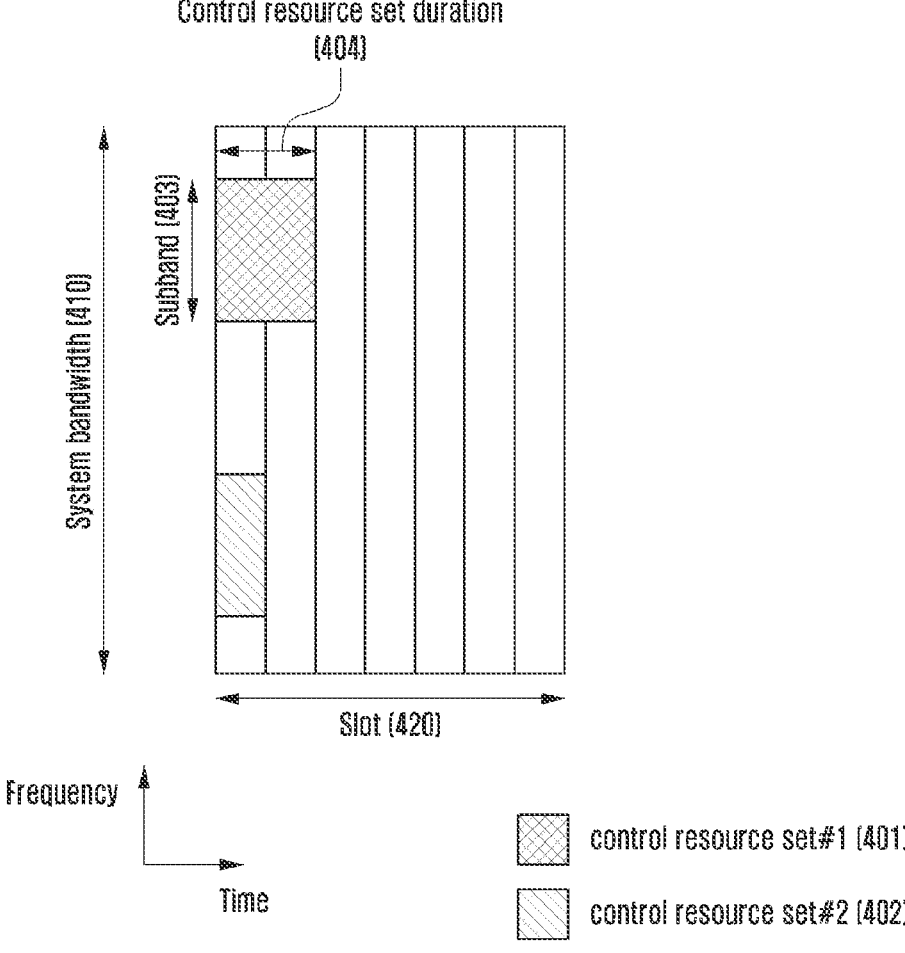
FIG. 4 illustrates an example of a control resource set (CORESET) in which a downlink control channel is transmitted in a 5G communication system.

FIG. 4 illustrates an example of a control resource set (CORESET) in which a downlink control channel is transmitted in a 5G communication system. FIG. 4 shows an example in which a system bandwidth 410 in a frequency axis and two CORESETs (CORESET #1 401 and CORESET #2 402) within one slot 420 (1 slot is assumed to be 7 OFDM symbols in the example of FIG. 4) in a time axis have been configured. The CORESET 401, 402 may be configured as a specific subband 403 within the full system bandwidth 410 in the frequency axis. The CORESET may be configured as one or multiple OFDM symbols in the time axis, which may be defined as control resource set duration 404. In the example of FIG. 4, the CORESET #1 401 is configured as control resource set duration of 2 symbols, and the CORESET #2 402 is configured as control resource set duration of 1 symbol.

The above-described control resource set in the 5G system may be configured by a base station with respect to a UE through higher layer signaling (e.g., system information, a master information block (MIB), or RRC signaling). Configuration of a control resource set in a UE is understood as providing information on the location of the control resource set, a subband, resource allocation of the control region, and control resource set duration. For example, control resource set configuration information may include information illustrated in Table 3 below.

TABLE 3

Configuration information 1. Frequency axis RB allocation information
Configuration information 2. CORESET start symbol
Configuration information 3. CORESET symbol length
Configuration information 4. REG bundling size (2 or 3 or 6)
Configuration information 5. Transmission mode (Interleaved transmission mode or Non-interleaved transmission mode)
Configuration information 6. DMRS configuration information (Precoder granularity)
Configuration information 7. Search space type (common search space, group-common search space, UE-specific search space)
Configuration information 8. DCI format to be monitored in a corresponding control region
- Other information In addition to the above configuration information, various pieces of information necessary for transmitting the downlink control channel may be configured for the UE.

Next, downlink control information (DCI) in the 5G system will be described in detail.

In the 5G system, scheduling information for uplink data (or physical uplink shared channel (PUSCH)) or downlink data (or physical downlink shared channel (PDSCH)) is transmitted from a base station to a UE through DCI. The UE may monitor a DCI format for fallback and a DCI format for non-fallback for PUSCH or PDSCH. The fallback DCI format may be configured as a fixed field between the base station and the UE, and the non-fallback DCI format may include a configurable field.

The fallback DCI for scheduling the PUSCH may include, for example, information as follows.

TABLE 4

Identifier for DCI formats - [1] bit
Frequency domain resource assignment -

$$[[\log_2(N_{RB}^{UL,BWP}(N_{RB}^{UL,BWP}+1)/2)]]] \text{ bits}$$

Time domain resource assignment - X bits
Frequency hopping flag - 1 bit.
Modulation and coding scheme - [5] bits
New data indicator - 1 bit
Redundancy version - [2] bits
HARQ process number - [4] bits
TPC command for scheduled PUSCH - [2] bits
   UL/SUL indicator (uplink/supplementary uplink indicator) - 0 or 1 bit The non-fallback DCI for scheduling the PUSCH may include, for example, information as follows.

TABLE 5

Carrier indicator (carrier identifier) - 0 or 3 bits
Identifier for DCI formats - [1] bits
Bandwidth part indicator 0 0, 1 or 2 bits TABLE 5-continued Frequency domain resource assignment For resource allocation type 0, $\lceil N_{RB}^{UL,BWP}/P \rceil$ bits For resource allocation type 1, $\lceil \log_2(N_{RB}^{UL,BWP}(N_{RB}^{UL,BWP}+1)/2) \rceil$ bits Time domain resource assignment - 1, 2, 3, or 4 bits
VRB-to-PRB mapping (virtual resource block-to-physical resource block mapping)- 0 or 1 bit, only for resource allocation type 1.
0 bit if only resource allocation type 0 is configured;

TABLE 5-continued 1 bit otherwise.
Frequency hopping flag - 0 or 1 bit, only for resource allocation type 1.
0 bit if only resource allocation type 0 is configured;
1 bit otherwise.
Modulation and coding scheme - 5 bits
New data indicator - 1 bit
Redundancy version - 2 bits as defined in section x.x of [6, TS38.214]
HARQ process number - 4 bits
1st downlink assignment index - 1 or 2 bits
1 bit for semi-static HARQ-ACK codebook;
2 bits for dynamic HARQ-ACK codebook with single HARQ-ACK codebook.
2nd downlink assignment index - 0 or 2 bits
2 bits for dynamic HARQ-ACK codebook with two HARQ-ACK sub-codebooks;
0 bit otherwise.
TPC command for scheduled PUSCH - 2 bits
Sounding reference signal (SRS) resource indicator- $$\left\lceil \log_2\left(\sum_{k=1}^{L_{max}} \binom{N_{SRS}}{k}\right)\right\rceil \text{ or } \lceil \log_2(N_{SRS}) \rceil \text{ bits}$$

$$\left\lceil \log_2\left(\sum_{k=1}^{L_{max}} \binom{N_{SRS}}{k}\right)\right\rceil \text{ bits for non-codebook based } PUSCH \text{ transmission;}$$

$\lceil \log_2(N_{SRS}) \rceil$ bits for non-codebook based PUSCH transmission;
Precoding information and number of layers - up to 6 bits
Antenna ports - up to 5 bits
SRS request - 2 bits
Channel state information (CSI) request - 0, 1, 2, 3, 4, 5, or 6 bits
Code block group (CBG) transmission information - 0, 2, 4, 6, or 8 bits
Phase tracking reference signal (PTRS)-demodulation reference signal (DMRS) association- 2 bits.
beta_offset indicator - 2 bits
DMRS sequence initialization - 0 or 1 bit
   UL/SUL indicator - 0 or 1 bit The fallback DCI for scheduling the PDSCH may include, for example, information as follows.

TABLE 6

Identifier for DCI formats - [1] bit
Frequency domain resource assignment - [ ] bits
Time domain resource assignment - X bits
VRB-to-PRB mapping - 1 bit.
Modulation and coding scheme - [5] bits
New data indicator - 1 bit
Redundancy version - [2] bits
HARQ process number - [4] bits
Downlink assignment index - 2 bits
TPC command for scheduled PUCCH - [2] bits
Physical uplink control channel (PUCCH) resource indicator) - [2] bits
- PDSCH-to-HARQ feedback timing indicator - [3] bits The non-fallback DCI for scheduling the PDSCH may include, for example, information as follows.

TABLE 7

Carrier indicator - 0 or 3 bits
Identifier for DCI formats - [1] bits
Bandwidth part indicator - 0, 1 or 2 bits
Frequency domain resource assignment
For resource allocation type 0, $\left\lceil N_{RB}^{DL,BWP}/P\right\rceil$ bits For resource allocation type 1, $\left\lceil \log_2\left(N_{RB}^{DL,BWP}\left(N_{RB}^{DL,BWP}+1\right)/2\right)\right\rceil$ bits Time domain resource assignment - 1, 2, 3, or 4 bits
VRB-to-PRB mapping - 0 or 1 bit, only for resource allocation type 1.
0 bit if only resource allocation type 0 is configured;
1 bit otherwise.
Physical resource block (PRB) bundling size indicator - 1 bit
Rate matching indicator - 0, 1, 2 bits
Zero power (ZP) CSI-RS trigger - X bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 4 bits
TPC command for scheduled PUCCH - 2 bits
PUCCH resource indicator
PDSCH-to-HARQ feedback timing indicator - 3 bits
Antenna ports - up to 5 bits
Transmission configuration indication - 3 bits
SRS request - 2 bits
CBG transmission information - 0, 2, 4, 6, or 8 bits
Code block group (CBG) flushing out information - 0 or 1 bit
DMRS sequence initialization - 0 or 1 bit The DCI may be transmitted through a PDCCH via a channel coding and modulation process. A CRC bit is added to a DCI message payload and CRC is scrambled by an RNTI corresponding to the identity of the terminal. Depending on the purpose of the DCI message, for example, terminal (UE)-specific data transmission, a power control command, or a random access response, different RNTIs are used. The RNTI is not explicitly transmitted, but is transmitted in the state of being included in a CRC calculation process. When the DCI message transmitted through the PDCCH is received, the terminal may identify the CRC through the allocated RNTI, and may recognize that the corresponding message is transmitted to the terminal when the CRC is determined to be correct based on the CRC identification result.

For example, DCI for scheduling the PDSCH for system information (SI) may be scrambled by an SI-RNTI. DCI for scheduling a PDSCH for a random access response (RAR) message may be scrambled by an RA-RNTI. DCI for scheduling a PDSCH for a paging message may be scrambled by a P-RNTI. DCI for notifying of a slot format indicator (SFI) may be scrambled by an SFI-RNTI. DCI for notifying of transmit power control (TPC) may be scrambled by a TPC-RNTI. DCI for scheduling a UE-specific PDSCH or PUSCH may be scrambled by a Cell RNTI (C-RNTI).

Figure 5:
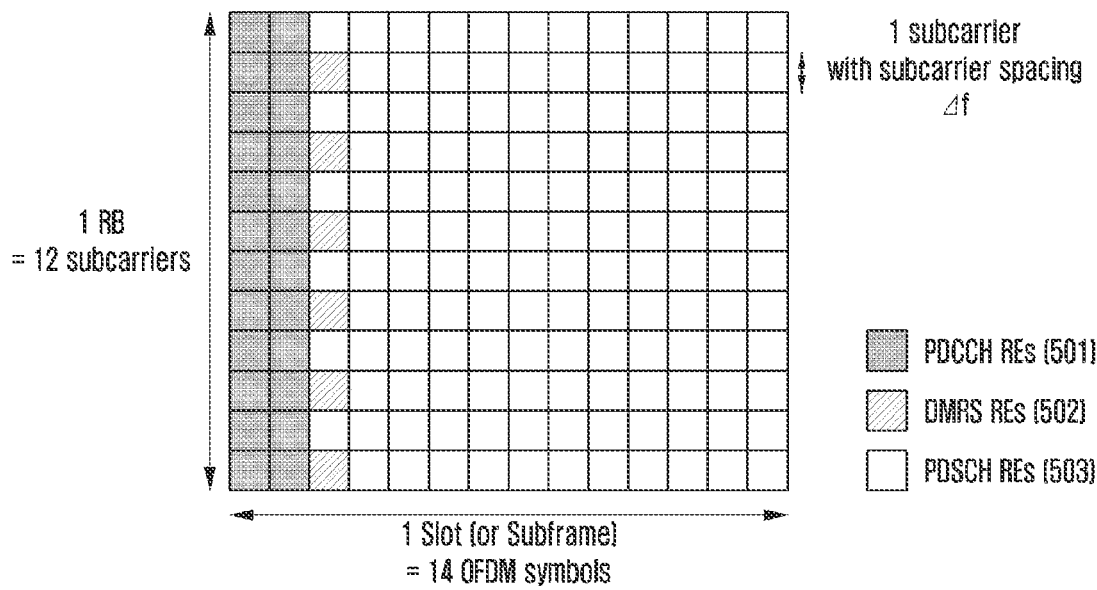
FIG. 5 illustrates an example in which a data channel is transmitted or received.

FIG. 5 illustrates an example in which a data channel is transmitted or received. When a specific terminal receives scheduling of a data channel, that is, the PUSCH or the PDSCH through the PDCCH, data may be transmitted or received along with the DMRS within the corresponding scheduled resource region. FIG. 5 illustrates a case in which a specific terminal uses 14 OFDM symbols as 1 slot (or subframe) in the downlink, and a PDCCH is transmitted through the first two OFDM symbols and a DMRS is transmitted in a third symbol. In FIG. 5, PDSCHs are mapped to REs in which no DMRS is transmitted in a third symbol and to REs in fourth to last symbols and transmitted within a specific RB in which the PDSCH is scheduled. Subcarrier spacing Δf shown in FIG. 5 is 15 kHz in the LTE and LTE-A systems and uses one of {15, 30, 60, 120, 240, 480} kHz in the 5G system.

Next, a synchronization signal (SS)/physical broadcast channel (PBCH), which may be mixed with a synchronization signal block (SSB) etc., in the NR system will be described. The SS/PBCH block may imply a physical layer channel block configured by a primary synchronization signal (primary SS (PSS)), a secondary synchronization signal (secondary SS (SSS)), and PBCH, one or multiple blocks may be transmitted within 5 ms time, and each SS/PBCH block to be transmitted may be distinguished by an index. The SS/PBCH block is specifically configured by the following signals and channels.

PSS: A signal that serves as a reference for downlink time and frequency synchronization, and provides some information of cell ID.

SSS: A signal that serves as a reference for downlink time and frequency synchronization, and provides remaining cell ID information not provided by PSS. Additionally, 'SSS' may serve as a reference signal for demodulation of a PBCH.

PBCH: A master information block (MIB) transmitted on the PBCH provides essential system information necessary for transmitting and receiving a data channel and a control channel of the UE. (PBCH may be interchangeably used with a broadcast signal.) The essential system information may include search space-related control information indicating radio resource mapping information of a control channel, scheduling control information on a separate data channel for transmitting system information, and the like. Specifically, the information included in the MIB includes the most significant bit (MSB) of the SS/PBCH block index, a half frame timing indicator, system frame number information, subcarrier spacing (SCS) information used for initial access and system information block (SIB) 1, SSB subcarrier offset information, DMRS location information for PDSCH, control resource set (CORESET) configuration information and search space configuration information by which DCI scheduling SIB1 is transmitted, and the like. The control resource set configured by the control resource set configuration information included in the MIB may be referred to as control resource set #0.

In addition, system information block 1 (SIB1) is also referred to as remaining minimum system information, and includes system information that the terminal needs to know before accessing the network. The system information implies common (i.e., not specific to each terminal) information required for one terminal to properly operate in a network. System information is transmitted to the UE in the form of several types of SIBs, and each SIB includes different types of system information.

In particular, SIB1 is periodically broadcast, and in particular, includes information for the terminal to perform initial random access. In general, other SIBs include system information that the terminal does not need to know before accessing the network.

Meanwhile, as described above, in order to measure the downlink channel state in a cellular system, a base station needs to transmit a reference signal. In the case of the LTE-A system, a terminal may measure the channel state between the base station and the terminal by using CRS or channel state information reference signal (CSI-RS) transmitted by the base station. Further, in the case of the NR system, the terminal may measure the channel state between the base station and the terminal by using CSI-RS or synchronization signal block (SSB). The channel state should be measured by considering various factors, which may include an amount of interference in downlink. The amount of interference in the downlink includes an interference signal and thermal noise generated by an antenna belonging to an adjacent base station, and the amount of interference in the downlink is important for the terminal to determine a downlink channel condition. For example, when a signal is transmitted from a base station having one transmission antenna to a terminal having one reception antenna, the terminal should determine energy per symbol that may be received through the downlink and the amount of interference to be simultaneously received in a section where the corresponding symbol is received by using the reference signal received from the base station, and should determine an energy per symbol to interference density ratio (Es/Io). The determined Es/Io may be converted into a data transmission speed or a value corresponding thereto, and may be transmitted to the base station in the form of a channel quality indicator (CQI) to enable the base station to determine at what data transmission speed the base station is to perform data transmission to the terminal.

In the case of LTE, LTE-A, or NR systems, the terminal may feedback information about the channel state of the DL to the base station so that the information is used for the base station to perform DL scheduling. That is, the terminal measures a reference signal transmitted by the base station through the DL and feeds back information extracted from the reference signal back to the base station in the form defined in the LTE and LTE-A standards. As describe above, the information which the terminal feeds back may be referred to as channel state information, and the channel state information may include the following three pieces of information.

Rank indicator (RI): the number of spatial layers that may be received by the terminal in a current channel state.

Precoding matrix indicator (PMI): an indicator of a precoding matrix preferred by the terminal in the current channel state.

Channel quality indicator (CQI): a maximum data rate at which the terminal may receive data in the current channel state.

The CQI may be replaced by a signal to interference plus noise ratio (SINR) that may be used similarly to the maximum data rate, a maximum error correction code rate and modulation method, data efficiency per frequency, and the like.

The RI, PMI, and CQI have meanings in association with one another. For example, a precoding matrix supported in the standard is differently defined per rank. Accordingly, a PMI value X when the RI has a value of 1 and the PMI value X when the RI has a value of 2 may be differently interpreted. Further, the terminal determines the CQI under an assumption that the PMI and X reported by the terminal to the base station is applied to the base station. That is, the terminal reporting RI_X, PMI_Y, and CQI_Z to the base station is equivalent to reporting that the terminal may receive a data rate corresponding to the CQI_Z when the rank is RI_X and the PMI is PMI_Y. As such, the terminal may assume in what transmission method the base station performs transmission when calculating the CQI, and may obtain an optimum performance when performing actual transmission using the corresponding transmission method.

RI, PMI, and CQI, which are channel state information fed back by the terminal, may be fed back in periodic, aperiodic, or semi-persistent form. When the base station intends to aperiodically acquire channel state information of a specific terminal, the base station may be configured to use an aperiodic feedback indicator (or channel state information request field, channel state information request information) included in DCI for the terminal to perform aperiodic feedback (or aperiodic channel state information reporting).

When aperiodic feedback is configured, feedback information (or channel state information) includes RI, PMI, and CQI, and the RI and PMI may not be fed back according to feedback configuration (or channel status report configuration).

Hereinafter, embodiments of the disclosure will be described in detail with reference to the accompanying drawings. The embodiments of the disclosure described below may be applied to other communication systems having a similar technical background or channel type. Accordingly, the embodiments of the disclosure may be applied to other communication systems through some modifications within a range that does not significantly deviate from the scope of the disclosure as determined by a person those skilled in the art.

In addition, in the description of the disclosure, when it is determined that a detailed description of a related function or configuration may unnecessarily obscure the gist of the disclosure, the detailed description thereof will be omitted. Further, the terms to be described later are terms defined by considering functions in the disclosure, which may vary according to intentions or customs of users and operators. Therefore, the definition should be made based on the content throughout this specification.

In the disclosure, a frame structure for wireless communication including a terahertz (THz) band is proposed. The disclosure proposes a frame structure and an operation of a base station and a terminal when an additional symbol is transmitted every 0.5 ms when extended to support a wider SCS according to the design principle of the frame structure of the existing NR system. In addition, the disclosure proposes an operation of a base station and a terminal to transmit and receive system information by transmitting a complementary sequence for every 0.5 ms. In addition, a method for designing a frame structure suitable for the terahertz band based on multiple conditions and a specific frame structure are proposed.

Figure 6A:
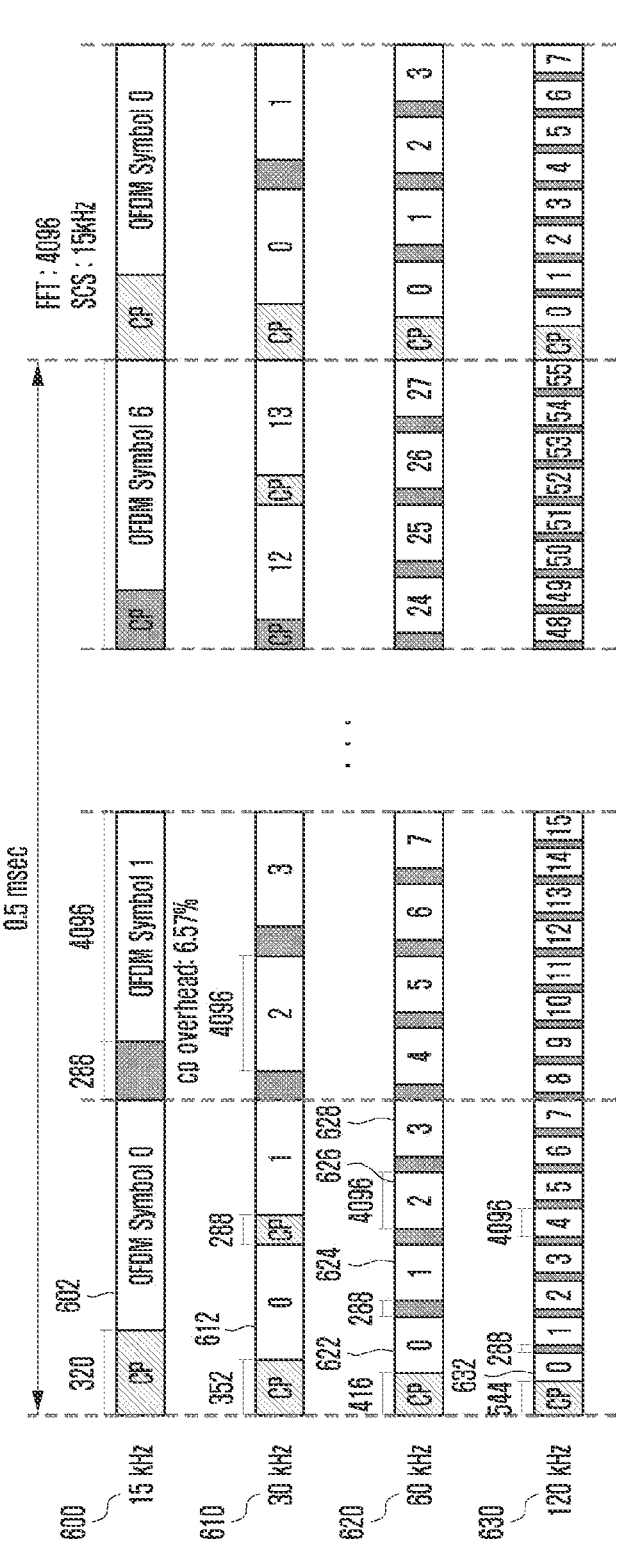
FIG. 6A illustrates an example of a frame structure of an NR system.

FIG. 6A illustrates an example of a frame structure of an NR system. The NR system supports SCS of 15, 30, 60, 120, and 240 kHz. 14 OFDM symbols are included per slot according to each SCS. Each OFDM symbol period corresponds to the sum of a cyclic prefix (CP) and an effective symbol length, and the CP implies that the last part of the OFDM symbol is copied and inserted into the beginning of the OFDM symbol. Inter-subcarrier orthogonality can be protected by reducing signal dispersion (time dispersion) on the time axis and inter-subcarrier interference through CP insertion. FIG. 6 illustrates a case in which the fast Fourier transform size (FFT size) is assumed to be 4096, and the number of CPs denotes the number of samples (samples, which may be understood as resources of a predetermined time unit).

When the SCS is 15 kHz (indicated by reference numeral 600), 7 OFDM symbols are included within 0.5 ms, among which the length of the cyclic prefix (CP) of the first symbol 602 is longer than the length of the CPs of other symbols. This is because the number of time units per slot is not divided by the number of symbols, the CP length of the first symbol is increased to fit the slot length of 1 ms. When the SCS is 30 kHz (indicated by reference numeral 610), 14 OFDM symbols are included within 0.5 ms, among which the length of the CP of the first symbol 612 is longer than the length of the CPs of other symbols. This is because the first OFDM symbol 602 at 0.5 ms of 15 kHz SCS is determined to achieve time synchronization with the first OFDM symbol 612 and second OFDM symbol 614 at 0.5 ms of 30 kHz SCS. That is, the length of the first symbol 602 at 0.5 ms of 15 kHz SCS is equal to the sum of the length of the first symbol 612 and the length the second symbol 614 at 0.5 ms of 30 kHz SCS.

When the SCS is 60 kHz (indicated by reference numeral 620), 28 OFDM symbols are included within 0.5 ms, among which the length of the CP of the first symbol 622 is longer than the length of the CPs of other symbols. This is because that the first OFDM symbol 602 at 0.5 ms of 15 kHz SCS is determined to achieve time synchronization with the first OFDM symbol 622, the second OFDM symbol 624, the third OFDM symbol 626, and the fourth OFDM symbol 628 at 0.5 ms of 60 kHz SCS.

Similarly, when the SCS is 120 kHz (indicated by reference numeral 630), 56 OFDM symbols are included within 0.5 ms, and the length of the CP of the first symbol 632 at 0.5 ms is longer than the length of the CPs of other symbols. In addition, the first OFDM symbol 602 at 0.5 ms of 15 kHz OFDM symbol among 7 OFDM symbols having 0.5 ms boundary when the SCS is 15 kHz, and T 652 is the length of the second and other OFDM symbols when the SCS is 15 kHz.

Figure 7:
FIG. 7 illustrates an example of an OFDM symbol when an SCS is extended to 15 kHz×2n.

FIG. 7 illustrates an example of an OFDM symbol when an SCS is extended to 15 kHz×2n. For example, in the case of n=8, 256 slots are included within 1 ms (indicated by reference numeral 700), and 128 slots are included within 0.5 ms. The length of a first slot 710 at 0.5 ms is 3.9 us, which includes 14 OFDM symbols. In this case, a first OFDM symbol 720 of the first slot 710 includes a CP 722 of 539.1 ns and an effective symbol length 724 of 260.4 ns. That is, the length occupied by the CP 722 in the first OFDM symbol 720 is 67.4%. On the other hand, a second OFDM symbol 730 includes a CP 732 of 18.3 ns and an effective symbol length 734 of 260.4 ns, and in this case, a ratio occupied by the CP 732 is 6.57%.

Table 8 shows a percentage ratio occupied by a CP (CP overhead) in the first symbol of the 0.5 ms time unit according to each SCS.

TABLE 8

| n | SCS (Hz) | CP overhead of the first symbol (%) |
|---|---|---|
| 0 | 15000 | 7.2 |
| 1 | 30000 | 7.9 |
| 2 | 60000 | 9.2 |
| 3 | 120000 | 11.7 |
| 4 | 240000 | 16.3 |
| 5 | 480000 | 24.2 |
| 6 | 960000 | 36.3 |
| 7 | 1920000 | 51.6 |
| 8 | 3840000 | 67.4 |

As can be seen from the above table, in the case of an SCS of n=5 or more that can be used in a terahertz or beyond 5G communication system, a ratio occupied by a CP in the first symbol is high. The disclosure proposes a method for reducing the excessive CP overhead and effectively using the first symbol.

Figure 8A:
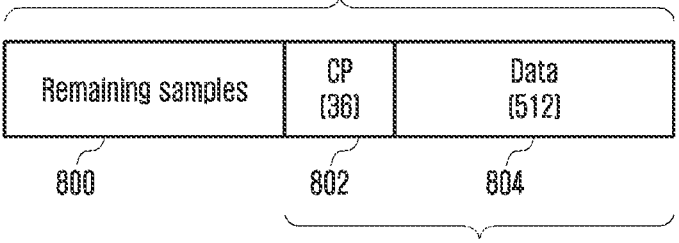
FIG. 8A illustrates an example of a structure of a first symbol for every 0.5 ms according to the disclosure.

FIG. 8A illustrates an example of a structure of a first symbol for every 0.5 ms of the disclosure. Assuming that a CP 802 and a valid symbol (or data) 804 constituting a general symbol exist in the first symbol, remaining samples such as reference numeral 800 may exist. Table 9 is a table describing the number of remaining samples according to SCS. Table 9 below describes a case in which SCS of n=5 or more that can be used in the beyond 5G system is applied.

TABLE 9

| n | Scaling | Subcarrier Spacing (kHz) | FFT size (Number of samples for data symbol) | Number of samples of normal CP | Number of remaining samples | CP overhead of other's symbols (%) | CP overhead of first symbol (%) |
|---|---|---|---|---|---|---|---|
| 5 | 32 | 480 | 512 | 36 | 128 | 6.569 | 24.2 |
| 6 | 64 | 960 | 512 | 36 | 256 | 6.569 | 36.3 |
| 7 | 128 | 1920 | 512 | 36 | 512 | 6.569 | 51.6 |
| 8 | 256 | 3840 | 512 | 36 | 1024 | 6.569 | 67.4 |
| 9 | 512 | 7680 | 512 | 36 | 2048 | 6.569 | 80.3 |
| 10 | 1024 | 15360 | 512 | 36 | 4096 | 6.569 | 89.0 |

SCS is time-synchronized with the first OFDM symbol 632 and up to the 8th OFDM symbol at 0.5 ms of 120 kHz SCS.

Figure 6B:
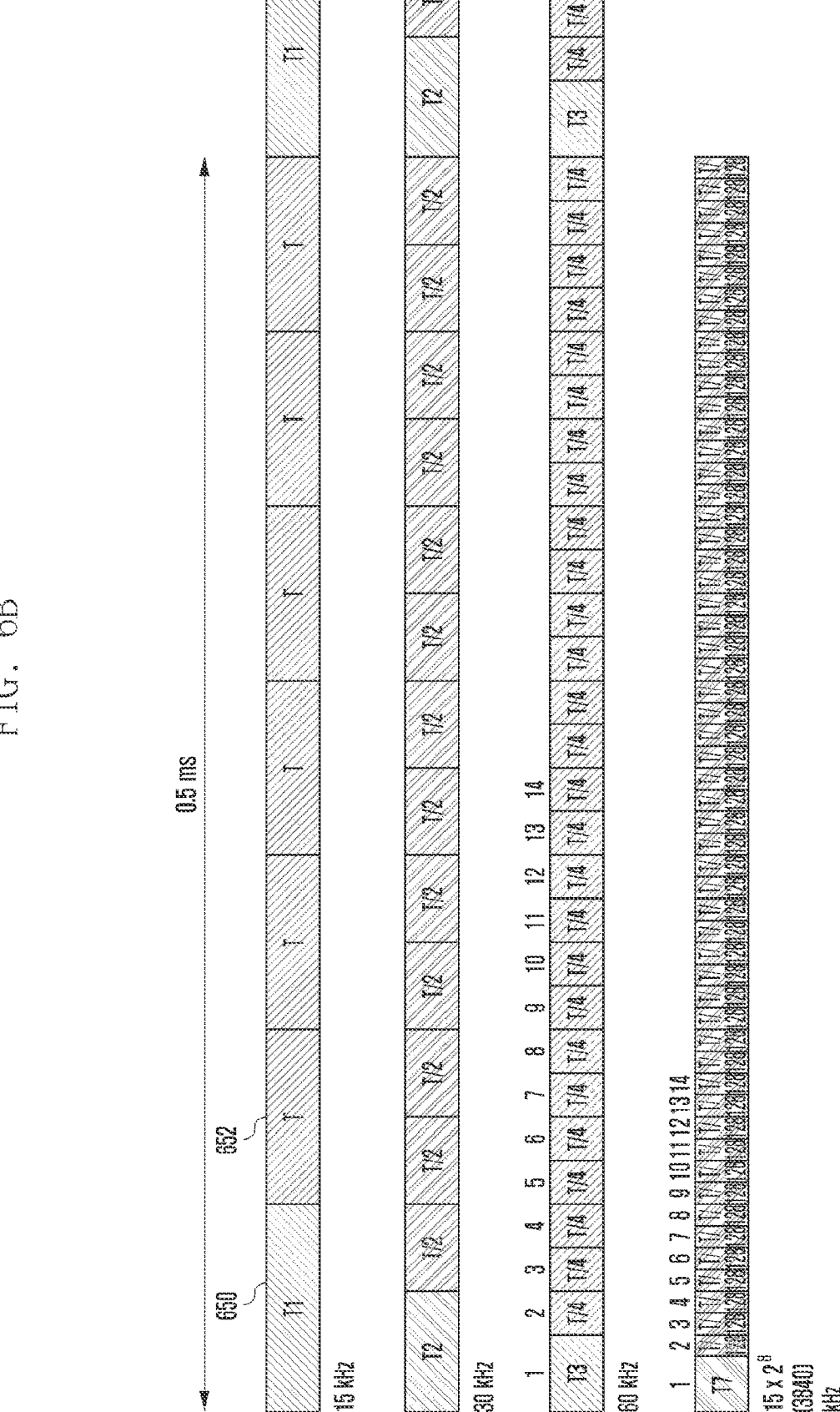
FIG. 6B illustrates an example of the length of a symbol when an SCS is extended.

FIG. 6B illustrates an example of the length of a symbol when an SCS is extended. T1 650 is the length of the first The first method is to additionally allocate X symbols to the remaining samples of the first symbol for every 0.5 ms. For one OFDM symbol transmission, 548 minimum samples, which is the sum of 36 samples for CP and 512 samples for effective symbol, are required. For example, in the case of n=8, the number of remaining samples is 1024, so one OFDM symbol may be allocated. Table 10 below describes the number of symbols that can be additionally allocated according to the SCS.

TABLE 10

| n | Subcarrier Spacing (kHz) | Number of samples allocated to data symbol | Number of samples allocated to CP | Number of samples remaining before the very first symbol per 0.5 ms | Number of additional symbols allocable to slot 0 per 0.5 ms |
|---|---|---|---|---|---|
| 0 | 15 | 512 | 36 | 4 | 0 |
| 1 | 30 | 512 | 36 | 8 | 0 |
| 2 | 60 | 512 | 36 | 16 | 0 |
| 3 | 120 | 512 | 36 | 32 | 0 |
| 4 | 240 | 512 | 36 | 64 | 0 |
| 5 | 480 | 512 | 36 | 128 | 0 |
| 6 | 960 | 512 | 36 | 256 | 0 |
| 7 | 1920 | 512 | 36 | 512 | 0 |
| 8 | 3840 | 512 | 36 | 1024 | 1 |
| 9 | 7680 | 512 | 36 | 2048 | 3 |
| 10 | 15360 | 512 | 36 | 4096 | 7 |

Table 10 assumes that the number of samples allocated to the effective symbol part in one symbol is 512, but the number of samples can be simply extended to 1024, 2048, and 4096.

According to Table 10, it may be seen that one additional symbol in the case of n=8, three additional symbols in the case of n=9, and seven additional symbols in the case of n=10 can be allocated at most, but the disclosure is not limited thereto. The number of allocated symbols may differ. For example, in the case of n=10, 7 or less symbols may be newly allocated.

Figure 8B:
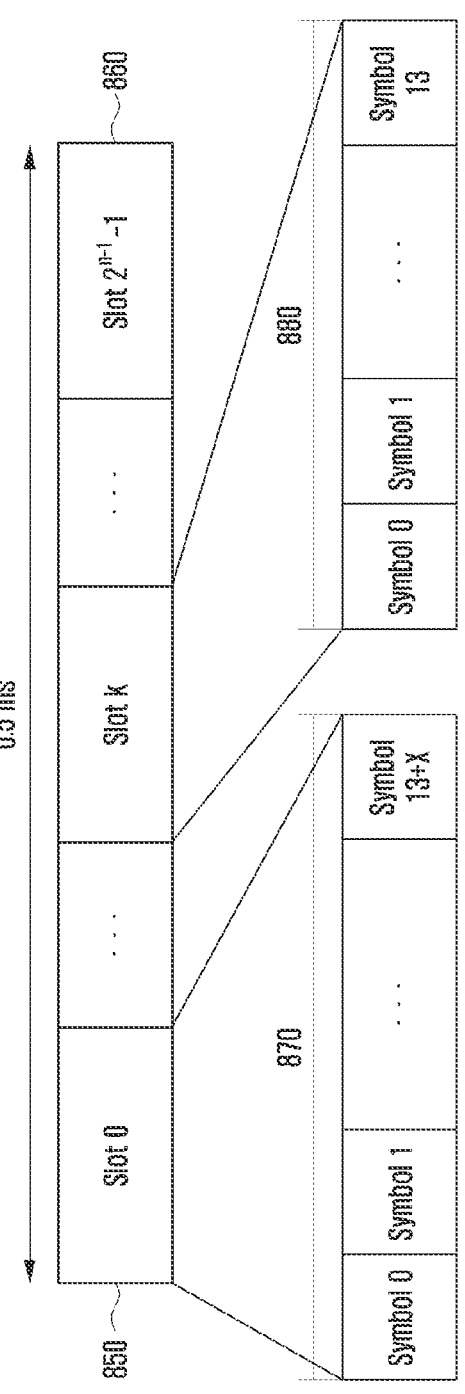
FIG. 8B illustrates an example of a slot and symbol structure in a time domain in the case of 15×2$^n$ kHz (n>=8) of an SCS according to the disclosure.

FIG. 8B illustrates an example of a slot and symbol structure in the time domain in the case of $15 \times 2^n$ kHz (n>=8) of an SCS according to the disclosure. According to FIG. 8B, $2^{n-1}$ slots are allocated every 0.5 ms in the same manner as the design principle of the NR system. In addition, 14 symbols 880 are allocated to slot k ($1 < k \le 2^{n-1}-1$) 860 in the same manner as the NR system, whereas according to the disclosure, X additional symbols are allocated to slot 0 850 and thus a total of (14+X) symbols 870 may be allocated. In addition, samples remaining after allocation of X additional symbols may be used for CP and for example, the CP of the first symbol may be lengthened as many times as the number of remaining symbols is provided.

Figure 9:
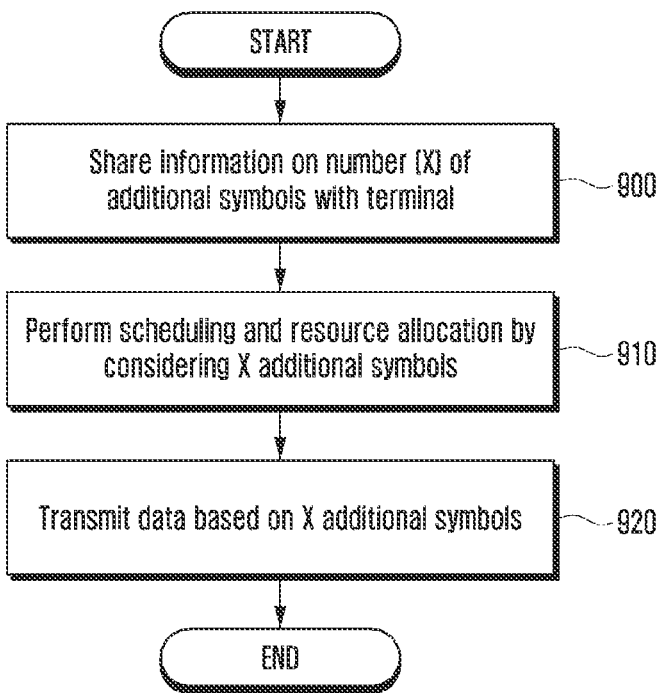
FIG. 9 illustrates an example of an operation performed by a base station when an additional symbol is allocated.

FIG. 9 illustrates an example of an operation performed by a base station when an additional symbol is allocated. First, the base station can transmit information on the number of additional symbols allocated (e.g., X) through RRC signaling (radio resource control signaling or higher layer signaling), master information block (MIB), system information block (SIB) (can be interchangeably used with system information), and the like. The additional symbol number information may directly indicate the value of X or indirectly indicate the same through a flag, a bitmap, or the like, and by which the value of X according to each SCS may be indicated (operation 900). Alternatively, when the base station is implemented, it is also possible that the value of X is preconfigured according to the value of n or that the value of X is defined in a standard. Alternatively, the base station does not signal the value of X, and the terminal may have to blindly detect whether additional symbols are allocated. In these cases, operation 900 may be omitted. The base station performs a process of transport block size determination, (data) scheduling, resource allocation, etc., by considering that a total of (14+X) symbols including X additional symbols are allocated to the first slot for every 0.5 ms (operation 910). The base station may transmit control information including, for example, data allocation information to the terminal, and the data allocation information may indicate a resource including an additionally allocated symbol. The base station maps data to an additional symbol and transmits the data to the terminal (operation 920). Alternatively, the base station may receive data from the terminal via the additional symbol. Each of the operations described above is merely an example, and the embodiment may be performed by changing the order, omitting one or more described operations, or adding undescribed operations.

Figure 10:
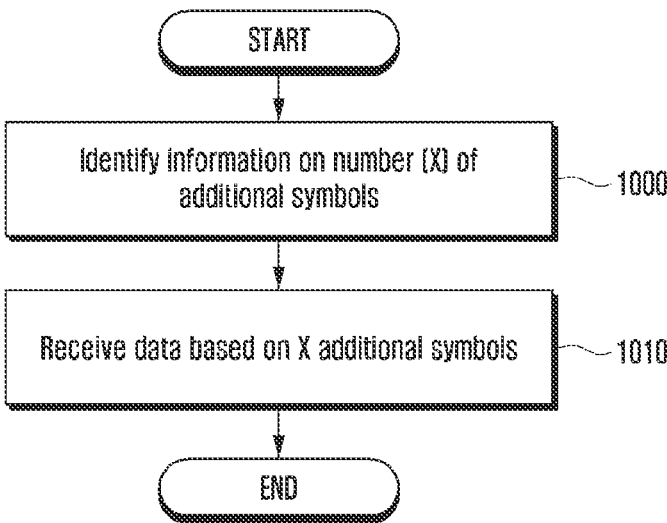
FIG. 10 illustrates an example of an operation performed by a terminal when an additional symbol is allocated.

FIG. 10 illustrates an example of an operation performed by a terminal when additional symbols are allocated. The terminal may acquire additional symbol number information (e.g., X) through signaling of a base station. For example, the additional symbol number information can be obtained through RRC signaling, MIB, SIB, or the like. The additional symbol number information may directly indicate the value of X or indirectly indicate through a flag, a bitmap, or the like, and the value of X according to each SCS may be indicated. Alternatively, when the terminal is implemented, it is also possible that the additional symbol number X information is preconfigured according to the value of n, or the value of X is defined in the standard. Alternatively, the terminal may blindly detect whether additional symbols are allocated and obtain the X value. As such, in the case of acquiring information on the value of n, the terminal can acquire X information corresponding thereto (operation 1000). Thereafter, the terminal may receive, for example, control information including data allocation information from the base station, and the data allocation information may indicate resources including additional allocated symbols. Thereafter, the terminal receives data allocated to (14+X) symbols in slot 0, which is the first slot, for every 0.5 ms (operation 1010). In this case, the terminal may perform demapping of a data symbol from the additionally allocated symbols. Alternatively, the terminal transmits data to the base station by using (14+X) symbols in slot 0. Each of the operations described above is merely an example, and the embodiment may be performed by changing the order thereof, omitting one or more described operations, or adding undescribed operations.

An additional symbol located in the first slot for every 0.5 ms may be located at the very front of the slot or at a predetermined location in the slot. For example, the additional symbol may be located at the rearmost part of the slot or located after the first symbol. The location of the additional symbol is predetermined, or it is also possible for the terminal to obtain the same through RRC signaling, MIB, SIB, etc., transmitted by the base station.

Table 11 is a table showing the number of samples still remaining to satisfy 0.5 ms alignment after allocation of X additional symbols to the first slot for every 0.5 ms.

TABLE 11

| n | Scaling | Subcarrier Spacing (kHz) | FFT size (number of samples for data symbol) | number of samples of normal CP | number of remaining samples (before) | Additional symbol in the first slot in 0.5 ms | # of remaining samples (after) |
|---|---|---|---|---|---|---|---|
| 0 | 1 | 15 | 512 | 36 | 4 | 0 | 4 |
| 1 | 2 | 30 | 512 | 36 | 8 | 0 | 8 |
| 2 | 4 | 60 | 512 | 36 | 16 | 0 | 16 |
| 3 | 8 | 120 | 512 | 36 | 32 | 0 | 32 |
| 4 | 16 | 240 | 512 | 36 | 64 | 0 | 64 |
| 5 | 32 | 480 | 512 | 36 | 128 | 0 | 128 |
| 6 | 64 | 960 | 512 | 36 | 256 | 0 | 256 |
| 7 | 128 | 1920 | 512 | 36 | 512 | 0 | 512 |
| 8 | 256 | 3840 | 512 | 36 | 1024 | 1 | 476 |
| 9 | 512 | 7680 | 512 | 36 | 2048 | 3 | 404 |
| 10 | 1024 | 15360 | 512 | 36 | 4096 | 7 | 206 |

Figure 11:
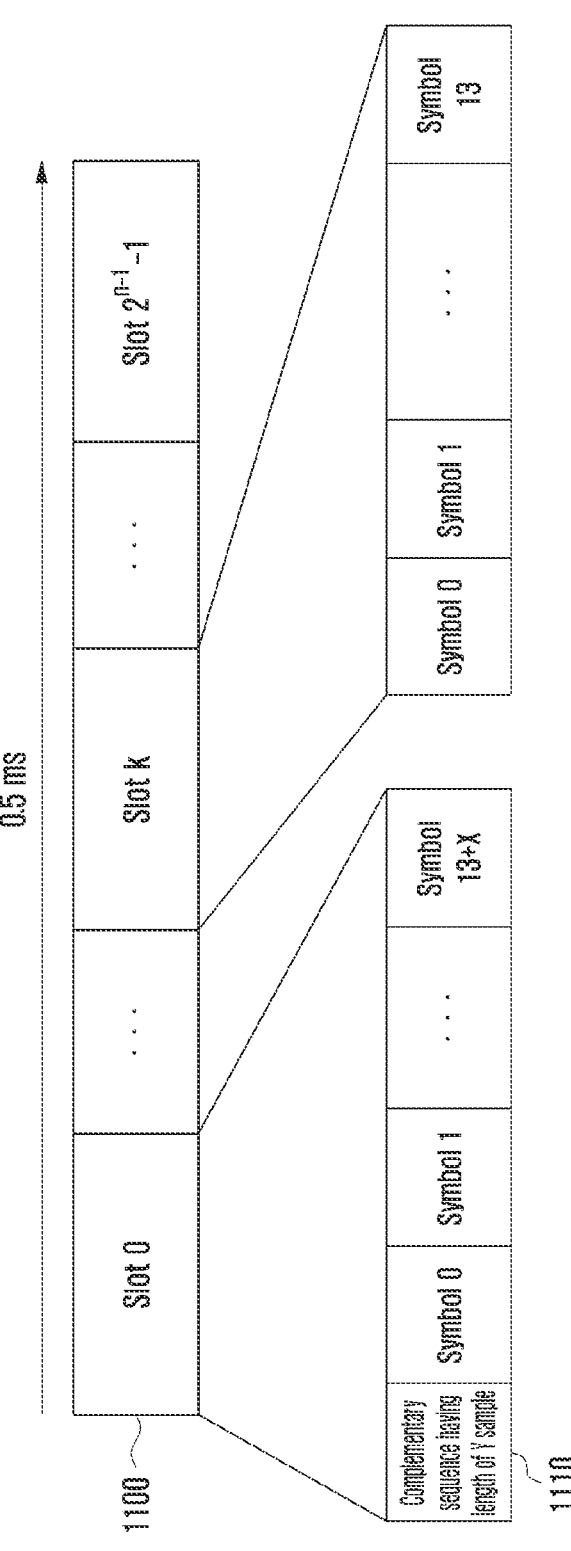
FIG. 11 illustrates an example of a frame structure using a remaining sample for every 0.5 ms as a complementary sequence.

For example, in the case of n=8, X (X=1) additional symbols are allocated to the first slot for every 0.5 ms, and thereafter, a total of 476 samples remain. By transmitting an additional sequence by using these remaining samples, efficient resource utilization may be possible. This method can be used separately or together with an example of additional symbol allocation described above. FIG. 11 illustrates an example of a frame structure using a remaining sample for every 0.5 ms as a complementary sequence. The structure of slot k ($1 \le k \le 2^{n-1}-1$) is the same as that of the existing NR system, and 14 symbols are allocated to one slot. However, in the disclosure, X additional symbols are allocated to first slot 0 1100 for every 0.5 ms and thus a total of (14+X) symbols are included therein, and a method for transmitting or receiving a complementary sequence by using the remaining Y samples 1110 is proposed. This complementary sequence may be transmitted or received using the earliest resource for every 0.5 ms. For example, as shown in Table 11, in the case of n=8, a complementary sequence having a length of 476 samples may be transmitted every 0.5 ms. In addition, the number of samples used in the complementary sequence does not necessarily use all the remaining samples (after additional symbol allocation or when there is no additional symbol allocation) according to the value of the SCS, and may be smaller than the number of remaining samples described in Table 11. In this case, the length of the CP of a specific symbol can be increased. For example, the length of the CP of the first symbol included in a slot can be increased.

The complementary sequence may be used for system information transmission or control information transmission of the base station, or may be used for transmission of uplink control information of the terminal. For example, the complementary sequence may indicate at least one piece of information included in the MIB or the SIB. For example, the complementary sequence may include system frame number information, information related to a control channel for receiving SIB1, or a part thereof during transmission through downlink. When the complementary sequence is transmitted through uplink, the complementary sequence may include a scheduling request (or information requesting resource allocation of a base station to transmit uplink data) or ACK/NACK information for downlink data. In addition, the complementary sequence may be, for example, a Zadoff-chu sequence or a Hadamard sequence in which each row of a Hadamard matrix constitutes a sequence. For example, when a Zadoff-Chu sequence is used, the value of the nth location of the root sequence using u among the Zadoff-Chu sequences may be identical to $$x_u(n) = \exp\left(-j\frac{\pi un(n + c_f + 2q)}{N_{ZC}}\right),$$

$c_f = N_{ZC} \bmod 2$, $N_{ZC}$ corresponds to the length of the sequence, and q corresponds to a cyclic shift value. In this case, the information to be indicated by each complementary sequence may be indicated by using the values of u and q.

For example, the complementary sequence may be generated by a transmission terminal based on a specific number of information, and similarly, the reception terminal may generate a possible sequence based on a specific number of information and receive a sequence transmitted by the transmission terminal to determine correlation therebetween on the time domain and determine that a sequence showing the highest correlation is transmitted by the transmission terminal.

The complementary sequence may be allocated to samples from the very first sample of a first slot to a sample before the additional symbol for every 0.5 ms boundary, or to a predetermined location of the first slot. For example, the complementary sequence is also possible to be allocated before a predetermined symbol (e.g., the first symbol) or to be located in the rearmost part of the first slot. The location of the complementary sequence is predetermined, or it is also possible for the terminal to obtain the same through RRC signaling, MIB, SIB, etc., transmitted by the base station.

Figure 12:
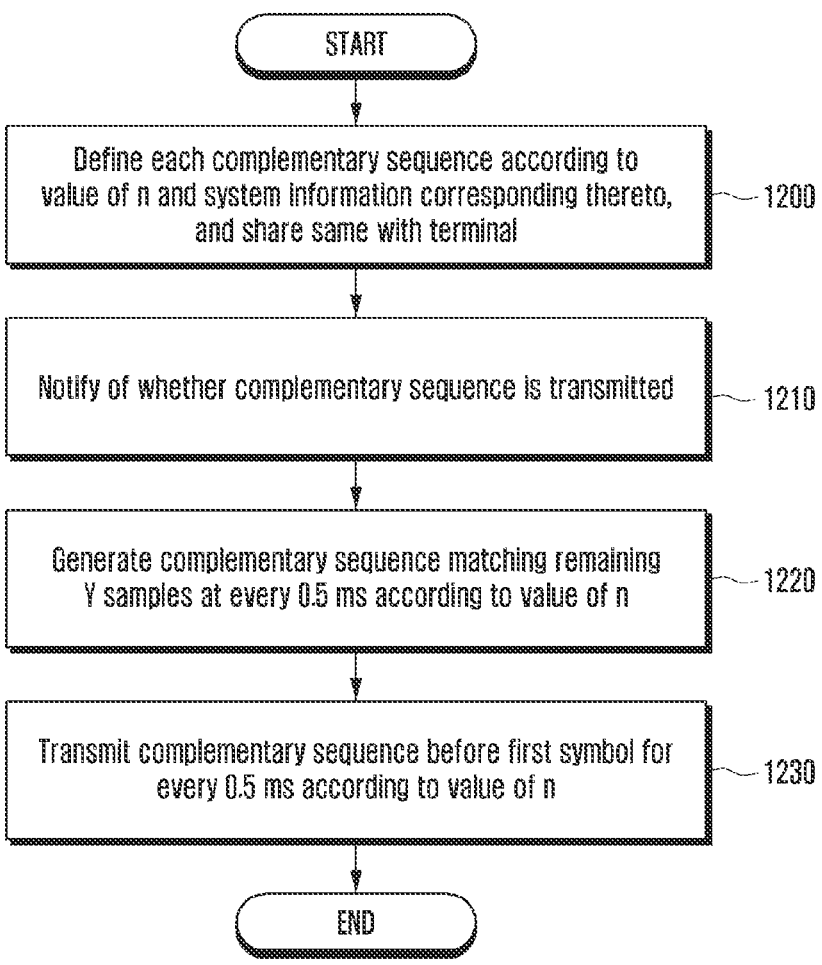
FIG. 12 illustrates an example of an operation of a base station when a complementary sequence is transmitted/received every 0.5 ms according to the value of n.

FIG. 12 illustrates an example of an operation of a base station when a complementary sequence is transmitted/received every 0.5 ms according to the value of n. First, the base station determines the length of the complementary sequence according to the n value of the SCS, and matches each complementary sequence with the system information based on system information to be transmitted. Here, the system information may be a part of the MIB or SIB. The base station shares a mapping relationship between each complementary sequence and corresponding system information with a terminal through RRC signaling, MIB, or SIB, or the mapping relationship may be preconfigured or may be determined in a standard. In this case, separate signaling may not be required (operation 1200). Thereafter, the base station notifies the terminal of information that the complementary sequence is transmitted through RRC signaling, MIB, SIB, or the like, or whether a report sequence is transmitted or not may be preconfigured or determined in a standard. In this case, information indicating whether the complementary sequence is transmitted may be transmitted through signaling such as information indicating whether to allocate additional symbols. Alternatively, even if the base station does not notify of whether the complementary sequence is transmitted, the terminal may blindly detect whether the complementary sequence is transmitted. In this case, signaling that the report sequence has been transmitted may be omitted (operation 1210). Thereafter, the base station generates a complementary sequence having a length of Y samples for the remaining every 0.5 ms according to the value of n (operation 1220). The base station transmits a complementary sequence in a sample located first (or time resource) at every 0.5 ms boundary (operation 1230). Alternatively, the terminal may transmit a complementary sequence in the sample located first at every 0.5 ms boundary, and this complementary sequence may be generated based on specific information among uplink control information transmitted by the terminal to the base station.

Figure 13:
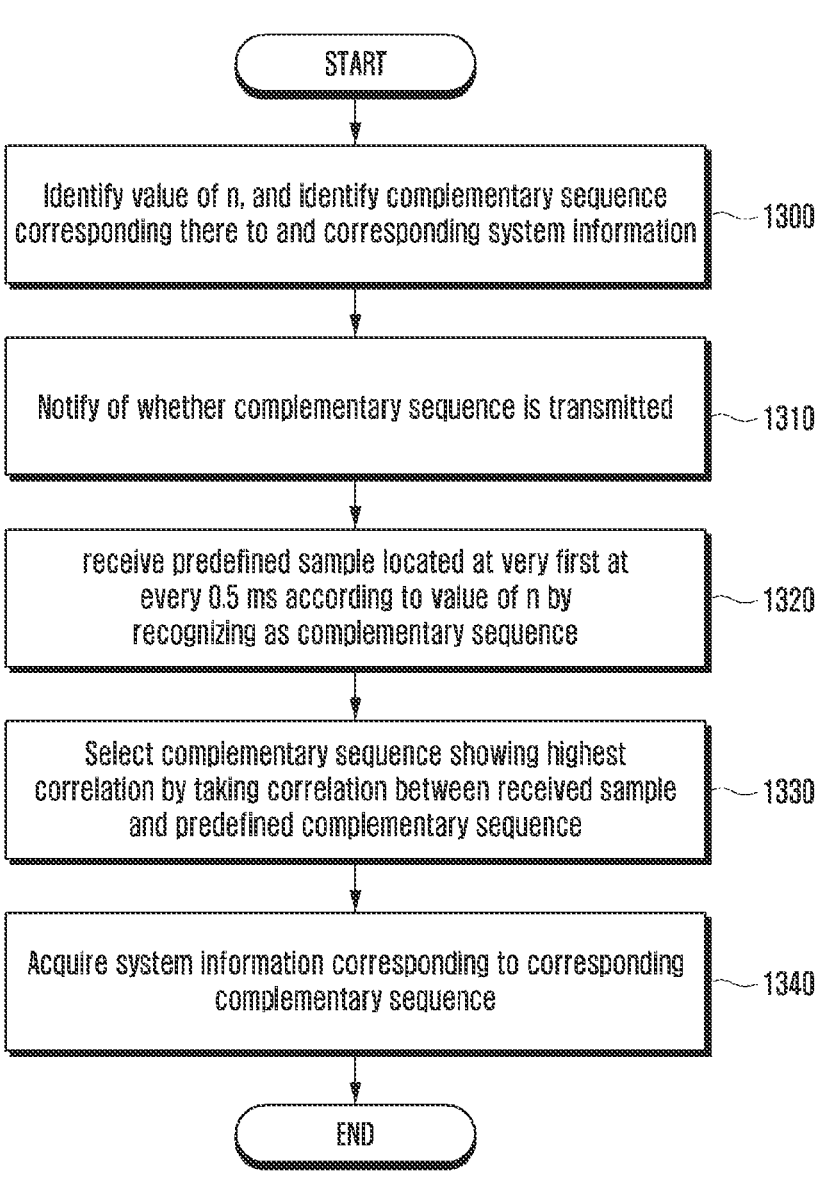
FIG. 13 illustrates an example of an operation of a terminal when a complementary sequence is transmitted/received every 0.5 ms according to the value of n.

FIG. 13 illustrates an example of an operation of a terminal when a complementary sequence is transmitted/received every 0.5 ms according to the value of n. For example, the terminal identifies the value of n through MIB or based on a transmission band, and acquires the length of a complementary sequence corresponding thereto, the type of the transmitted complementary sequence, and mapping relationship information between the system information and the type of the transmitted complementary sequence (operation 1300). Such acquisition is possible through RRC signaling, MIB, SIB, or the like. Alternatively, the mapping relationship information may be preconfigured or may be determined in a standard. The terminal may recognize whether the complementary sequence is transmitted, through MIB, SIB, or separate signaling such as RRC signaling or through a pre-configuration process, or may detect the same in a blind manner. In this case, the information indicating whether the complementary sequence is transmitted may be received through signaling such as information indicating whether to allocate additional symbols. Here, blind detection corresponds to taking a correlation between the complementary sequence already known by the terminal and the received sequence and determining that the complementary sequence is transmitted when the correlation is greater than or equal to a specific threshold. Alternatively, whether the complementary sequence is transmitted may be determined in a standard (operation 1310). Thereafter, the terminal receives a predefined number of samples located first at every 0.5 ms boundary according to the value of n by recognizing as corresponding to the complementary sequence (operation 1320). The terminal selects a complementary sequence showing the highest correlation by taking a correlation between the received sample and a predefined complementary sequence (operation 1330). Thereafter, the terminal acquires system information corresponding to a complementary sequence showing the highest correlation through the mapping relationship between the system information and the complementary sequence (operation 1340).

Figure 14:
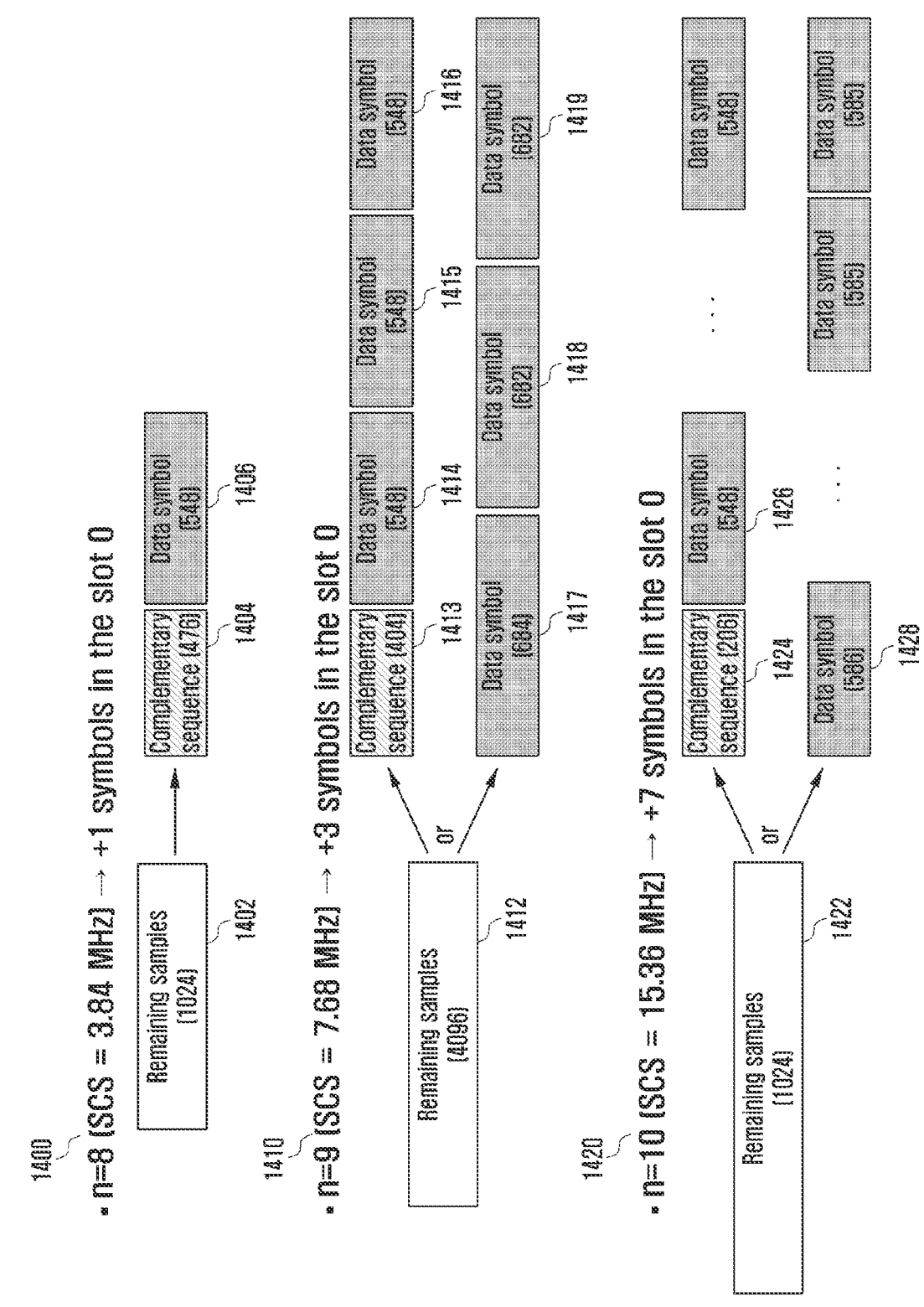
FIG. 14 illustrates an example of allocation of an additional symbol and a complementary symbol according to each SCS.

FIG. 14 illustrates an example of allocation of an additional symbol and a complementary symbol according to each SCS. According to FIG. 14, in the case of n=8, one additional symbol may be allocated to slot 0 (indicated by reference numeral 1400). In this case, the number of remaining samples 1402 may be 1024, 476 samples may be allocated to a complementary sequence 1404, and 548 samples may be allocated to an additional symbol 1406. In the case of n=9, three additional symbols may be allocated to slot 0 (indicated by reference numeral 1410). Here, the number of remaining samples 1412 is 2048, 404 samples may be allocated to a complementary sequence 1413, and 548 samples may be allocated to each of additional symbols 1414, 1415, and 1416. Alternatively, when a complementary sequence is not allocated, 684, 682, and 682 samples may be allocated to additional symbols 1417, 1418, and 1419, respectively. In this case, the length of a CP in each additional symbol may be increased.

In the case of n=10, 7 additional symbols may be allocated to slot 0 (indicated by reference numeral 1420). In this case, the number of remaining samples 1422 may be 4096, 206 samples may be allocated to a complementary sequence 1424, and 548 samples may be allocated to each of 7 additional symbols 1426. Alternatively, when a complementary sequence is not allocated, 586, 585, 585, 585, 585, 585, and 585 samples may be allocated to seven additional symbols 1428, respectively. The number of samples of the complementary sequence and the additional symbol shown in FIG. 14 is only an example, and the disclosure is not limited to the specific number of samples.

In addition, a complementary sequence may be generated by maintaining the same sampling rate as that of an effective symbol part. For example, when the FFT size is 1024 and 600 modulated symbols are input to an IFFT part, the channel bandwidth becomes $\Delta f \times 600$ ($\Delta f$=SCS). In addition, since an effective symbol is an OFDM symbol, the effective symbol length becomes T=1/$\Delta f$. If the number of samples used in the complementary sequence is 128, which corresponds to T/8, the length of the complementary sequence is also 600/8=75, and a complementary sequence having the length of 75 may be input to the IFFT part. In this case, the channel bandwidth is 8 $\Delta f \times 75$ and may be equal to the channel bandwidth of the effective symbol part.

Below, a new frame structure other than the frame structure used in LTE or NR systems is proposed. Specifically, the disclosure suggests the following conditions for designing a new frame structure, and proposes a frame structure that satisfies all or part of each condition.

Condition A corresponds to a condition in which $$15\ \text{kHz} \times \frac{n}{m} \times 2^l$$

of SCS, an integer of l≥0, m∈{1, 3, 5, $3^2$, 3×5, $5^2$}, or 15 kHz×$2^l$×$3^m$×$5^n$, where, l, m, and n are limited to integers greater than or equal to 0. This is obtained by considering phase locked loop (PLL) clock multiplication, but the disclosure is not limited thereto. In addition, an SCS within 2.8 to 3.4 MHz is selected by considering phase noise.

Figure 15:
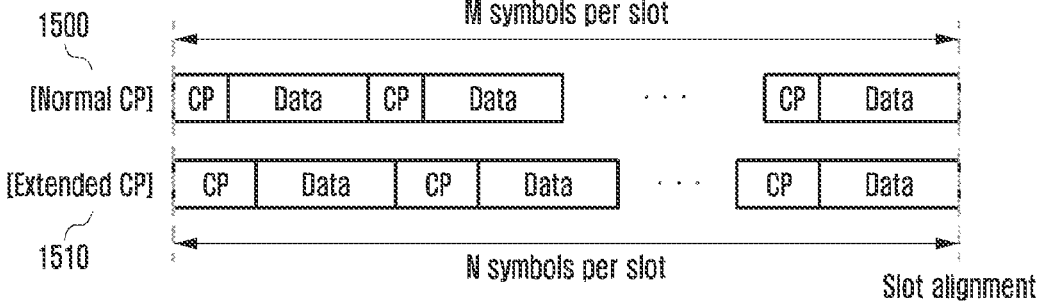
FIG. 15 illustrates an example of slot alignment.

Condition B corresponds to a slot alignment condition and is a condition in which the length of a slot configured by a symbol having a normal CP and the length of a slot configured by a symbol having an extended CP (which may be obtained by considering a communication environment in which a delay may be longer) should be the same. FIG. 15 illustrates an example of slot alignment. According to FIG. 15, when M symbols having a normal CP are included in a slot (indicated by reference numeral 1500) and N symbols having an extended CP are included in a slot (indicated by reference numeral 1510), the lengths of the slots are the same. In this case, M×(length of normal CP+length of effective symbol)=N×(length of extended CP+length of effective symbol) should be satisfied.

Condition C corresponds to a condition that the CPs of all symbols are the same.

Condition D corresponds to a condition in which a plurality of slots are accurately packed in 1 ms. That is, this condition implies that the sum of the lengths of the plurality of slots becomes 1 ms.

FIG. 16 illustrates an example of a frame structure that satisfies conditions A, B and C, the condition A satisfying $$15 \text{ kHz} \times \frac{n}{m} \times 2^{l}$$

of SCS, an integer of l≥0, and m∈{1, 3, 5, $3^2$, 3×5, $5^2$}. FIG. 16 illustrates an example of a frame structure in which SCS is selected in the range of 2.7 MHz to 3.4 MHz from condition A, and the length of the normal CP is selected in the range of 20 to 24 ns and the length of the extended CP is selected in the range of 40 to 50 ns while satisfying conditions B and C. According to FIG. 16, in the case of SCS satisfying the above conditions A, B, and C and normal CP and extended CP thereof, the symbol length, the effective symbol length, the length of normal CP and extended CP, the overhead of the normal CP, the overhead of the extended CP, the number of symbols per slot when the normal CP and the extended CP are used, and the length of the slot are shown. The number of samples described in FIG. 16 is obtained by assuming that the FFT size is 512, that is, the number of samples of an effective symbol is 512, but the disclosure is not limited to this example.

For example, when the SCS is 2880 kHz, the length of the symbol including the normal CP may be $3.69*10^{-7}$ s, and the length of the symbol including the extended CP may be $3.91*10^{-7}$ s, and the length of effective symbol within one symbol may be $3.47*10^{-7}$ s. In this case, the length of the normal CP may be $2.17*10^{-8}$, and the length of the extended CP may be $4.34*10^{-8}$ s. Here, 18 symbols having a normal CP may be included in one slot, 17 symbols having an extended CP may be included therein, and the length of the slot may be $6.64*10^{-6}$ s.

The base station and the terminal may transmit or receive signals based on this frame structure.

FIG. 17 illustrates an example of a frame structure that satisfies conditions A, B, C, and D, the condition A satisfying $$15 \text{ kHz} \times \frac{n}{m} \times 2^{l}$$

of SCS, an integer of l≥0, and m∈{1, 3, 5, $3^2$, 3×5, $5^2$}. FIG. 17 illustrates an example of a frame structure in which SCS is selected in the range of 2.6 MHz to 3.0 MHz from condition A, and the length of the normal CP is selected in the range of 20 to 24 ns and the length of the extended CP is selected in the range of 40 to 50 ns while satisfying conditions B, C, and D. According to FIG. 17, in the case of SCS satisfying the above conditions A, B, C, and D, and normal CP and extended CP thereof, the number of symbols per slot, the number of slots in 1 ms, the length of slot, the length of symbols for normal CP and extended CP, the length of effective symbols, the number of samples for normal CP and extended CP, the overhead of normal CP, the overhead of extended CP are shown. The number of samples described in FIG. 17 is obtained by assuming that the FFT size is 512, that is, the number of samples of an effective symbol is 512, but the disclosure is not limited to this example.

The base station and the terminal may transmit or receive signals based on this frame structure.

FIG. 18 illustrates an example of a frame structure that satisfies conditions A, C, and D, the condition A satisfying 15 kHz×$2^{l}$×$3^{m}$×$5^{n}$ of SCS, and l, m, and n being limited to integers greater than or equal to 0. FIG. 18 illustrates an example of a frame structure in which SCS is selected in the range of 2.4 MHz to 4.1 MHz in condition A, and the length of the normal CP is selected in the range of 15 to 70 ns, and the number of symbols per slot satisfies 9 while satisfying conditions C and D. According to FIG. 18, SCS satisfying the above conditions A, C, and D, the number of slots packed in 1 ms according to each SCS, the number of samples of CP, the length of symbols including CP, the length of effective symbol, and the length of CP are shown. The number of samples described in FIG. 18 is obtained by assuming that the FFT size is 512, that is, the number of samples of an effective symbol is 512, but the disclosure is not limited to this example.

The base station and the terminal may transmit or receive signals based on this frame structure. FIG. 19 illustrates another example of a frame structure that satisfies conditions A, C, and D, the condition A satisfying 15 kHz×$2^{l}$×$3^{m}$×$5^{n}$ of SCS, and l, m, and n being limited to integers greater than or equal to 0. FIG. 19 shows an example of a frame structure in which SCS is selected in the range of 2.4 MHz to 4.1 MHz from condition A, and the length of the normal CP is selected in the range of 15 to 70 ns and the number of symbols per slot satisfies 10 while satisfying conditions C and D. According to FIG. 19, SCS satisfying the above conditions A, C, and D, the number of slots packed in 1 ms according to each SCS, the number of samples of CP, the length of symbols including CP, the length of effective symbol, and the length of CP are shown. The number of samples described in FIG. 19 is obtained by assuming that the FFT size is 512, that is, the number of samples of an effective symbol is 512, but the disclosure is not limited to this example.

The base station and the terminal may transmit or receive signals based on this frame structure.

FIG. 20 illustrates still another example of a frame structure that satisfies conditions A, C, and D, the condition A satisfying 15 kHz×$2^{l}$×$3^{m}$×$5^{n}$ of SCS, and l, m, and n being limited to integers greater than or equal to 0. FIG. 20 shows an example of a frame structure in which SCS is selected in the range of 2.4 MHz to 4.1 MHz from condition A, and the length of the normal CP is selected in the range of 15 to 70 ns and the number of symbols per slot satisfies 12 while satisfying conditions C and D. According to FIG. 20, SCS satisfying the above conditions A, C, and D, the number of slots packed in 1 ms according to each SCS, the number of samples of CP, the length of symbols including CP, the length of effective symbol, and the length of CP are shown. The number of samples described in FIG. 20 is obtained by assuming that the FFT size is 512, that is, the number of samples of an effective symbol is 512, but the disclosure is not limited to this example.

The base station and the terminal may transmit or receive signals based on this frame structure.

FIG. 21 illustrates yet another example of a frame structure that satisfies conditions A, C, and D, the condition A satisfying 15 kHz×$2^{l}$×$3^{m}$×$5^{n}$ of SCS, and l, m, and n being limited to integers greater than or equal to 0. FIG. 21 shows an example of a frame structure in which SCS is selected in the range of 2.4 MHz to 4.5 MHz from condition A, and the length of the normal CP is selected in the range of 15 to 70 ns and the number of symbols per slot satisfies 15 while satisfying conditions C and D. According to FIG. 21, SCS satisfying the above conditions A, C, and D, the number of slots packed in 1 ms according to each SCS, the number of samples of CP, the length of symbols including CP, the length of effective symbol, and the length of CP are shown. The number of samples described in FIG. 21 is obtained by assuming that the FFT size is 512, that is, the number of samples of an effective symbol is 512, but the disclosure is not limited to this example.

The base station and the terminal may transmit or receive signals based on this frame structure.

FIG. 22 illustrates a further example of a frame structure that satisfies conditions A, C, and D, the condition A satisfying 15 kHz×$2^l$×$3^m$×$5^n$ of SCS, and l, m, and n being limited to integers greater than or equal to 0. FIG. 22 shows an example of a frame structure in which SCS is selected in the range of 2.4 MHz to 4.5 MHz from condition A, and the length of the normal CP is selected in the range of 15 to 70 ns and the number of symbols per slot satisfies 16 while satisfying conditions C and D. According to FIG. 22, SCS satisfying the above conditions A, C, and D, the number of slots packed in 1 ms according to each SCS, the number of samples of CP, the length of symbols including CP, the length of effective symbol, and the length of CP are shown. The number of samples described in FIG. 22 is obtained by assuming that the FFT size is 512, that is, the number of samples of an effective symbol is 512, but the disclosure is not limited to this example.

The base station and the terminal may transmit or receive signals based on this frame structure.

FIG. 23 illustrates yet a further example of a frame structure that satisfies conditions A, C, and D, the condition A satisfying 15 kHz×$2^l$×$3^m$×$5^n$ of SCS, and l, m, and n being limited to integers greater than or equal to 0. FIG. 23 shows an example of a frame structure in which SCS is selected in the range of 2.4 MHz to 4.5 MHz from condition A, and the length of the normal CP is selected in the range of 15 to 70 ns and the number of symbols per slot satisfies 18 while satisfying conditions C and D. According to FIG. 23, SCS satisfying the above conditions A, C, and D, the number of slots packed in 1 ms according to each SCS, the number of samples of CP, the length of symbols including CP, the length of effective symbol, and the length of CP are shown. The number of samples described in FIG. 23 is obtained by assuming that the FFT size is 512, that is, the number of samples of an effective symbol is 512, but the disclosure is not limited to this example.

The base station and the terminal may transmit or receive signals based on this frame structure.

FIG. 24 illustrates still a further example of a frame structure that satisfies conditions A, C, and D, the condition A satisfying 15 kHz×$2^l$×$3^m$×$5^n$ of SCS, and l, m, and n being limited to integers greater than or equal to 0. FIG. 24 shows an example of a frame structure in which SCS is selected in the range of 2.4 MHz to 4.5 MHz from condition A, and the length of the normal CP is selected in the range of 15 to 70 ns and the number of symbols per slot satisfies 20 while satisfying conditions C and D. According to FIG. 21, SCS satisfying the above conditions A, C, and D, the number of slots packed in 1 ms according to each SCS, the number of samples of CP, the length of symbols including CP, the length of effective symbol, and the length of CP are shown. The number of samples described in FIG. 24 is obtained by assuming that the FFT size is 512, that is, the number of samples of an effective symbol is 512, but the disclosure is not limited to this example.

The base station and the terminal may transmit or receive signals based on this frame structure.

Figure 25:
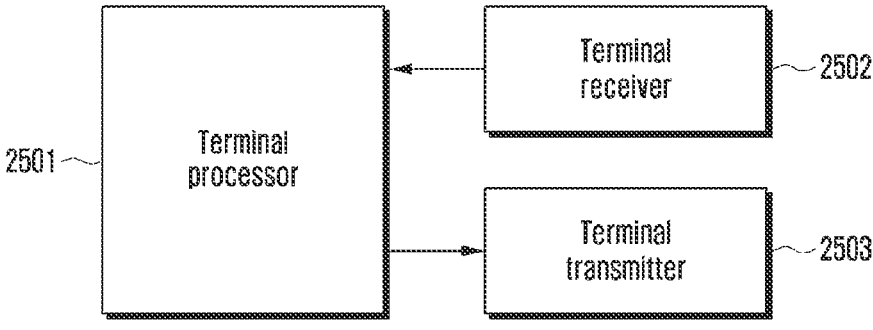
FIG. 25 is a block diagram illustrating an internal structure of a terminal according to an embodiment of the disclosure.
Figure 26:
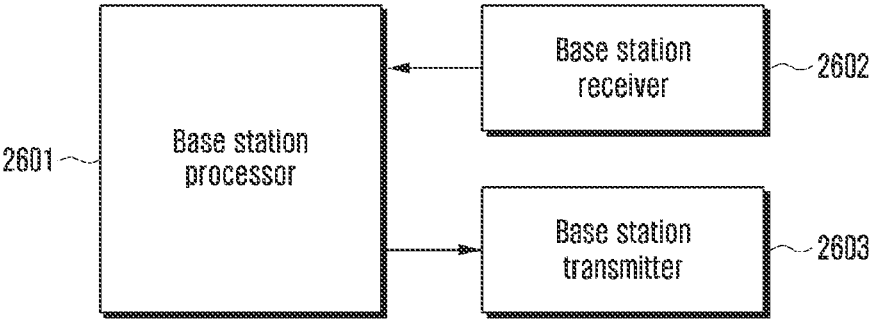
FIG. 26 is a block diagram illustrating an internal structure of a base station according to an embodiment of the disclosure.

In order to perform the above embodiments of the disclosure, a transmitter, a receiver, and a controller of a terminal and a base station are shown in FIGS. 25 and 26, respectively. A method for transmission or reception by a base station and a terminal are shown in order to apply a method for transmitting or receiving a downlink control channel and a data channel in a communication system corresponding to the above embodiment. In order to perform the above method, a transmitter, a receiver, and a processor of a base station and a terminal should each operate according to an embodiment.

Specifically, FIG. 25 is a block diagram illustrating an internal structure of a terminal according to an embodiment of the disclosure. As shown in FIG. 25, the terminal of the disclosure may include a terminal processor 2501, a receiver 2502, and a transmitter 2503.

The terminal processor 2501 may be configured to control a series of processes so that the terminal may operate according to the above-described embodiment of the disclosure. For example, the terminal processor 2501 may be configured to perform control to receive and decode symbols additionally allocated and transmitted by a base station according to an embodiment of the disclosure, and to identify system information by receiving and identifying a complementary sequence. The terminal receiver 2502 and the terminal transmitter 2503 may be collectively referred to as a transceiver in the embodiment of the disclosure. The transceiver may transmit/receive a signal to/from the base station. The signal may include control information and data. To this end, the transceiver may include an RF transmitter configured to up-convert and amplify a frequency of a transmitted signal, and an RF receiver configured to low-noise amplify a received signal and down-convert a frequency thereof. In addition, the transceiver may be configured to receive a signal through a wireless channel and output the received signal to the terminal processor 2501, and to transmit a signal, which is output from the terminal processor 2501, through a wireless channel.

FIG. 26 is a block diagram illustrating an internal structure of a base station according to an embodiment of the disclosure. As shown in FIG. 26, the base station of the disclosure may include a base station processor 2601, a receiver 2602, and a transmitter 2603.

The base station processor 2601 may be configured to control a series of processes so that the base station can operate according to the above-described embodiment of the disclosure. For example, the base station processor 2601 may be configured to perform control to transmit a signal by using X additional symbols additionally allocated to the first slot for every 0.5 ms according to the value of n, and/or to transmit necessary information to the terminal by defining system information corresponding to a complementary sequence and transmitting the complementary sequence in Y samples before the additionally allocated symbols according to the embodiment of the disclosure. The base station receiver 2602 and the base station transmitter 2603 may be collectively referred to as a transceiver in the embodiment of the disclosure. The transceiver may transmit/receive a signal to/from the terminal. The signal may include control information and data. To this end, the transceiver may include an RF transmitter configured to up-convert and amplify a frequency of a transmitted signal, and an RF receiver configured to low-noise amplify a received signal and down-convert a frequency thereof. In addition, the transceiver may be configured to receive a signal through a wireless channel and output the received signal to the base station processor

2601, and transmit a signal, which is output from the base station processor 2601, through the wireless channel.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary.

The invention claimed is:

1. A method performed by a base station of a communication system, the method comprising:

identifying a subcarrier spacing for a communication between the base station and a terminal;

transmitting, to the terminal, a signal including information indicating at least one of whether an additional symbol is allocated or a number of additional symbols, wherein the number of additional symbols is based on the subcarrier spacing;

generating data allocation information for mapping data based on the allocation of the additional symbol; and transmitting, to the terminal, the data allocation information and the mapped data, wherein the additional symbol is allocated to a predetermined part of a first slot for every 0.5 ms boundary, wherein in case that the subcarrier spacing is $15 \times 2^n$ kHz and n is 8, the number of the additional symbols is at most 1, wherein in case that the subcarrier spacing is $15 \times 2^n$ kHz and n is 9, the number of the additional symbols is at most 3, and wherein in case that the subcarrier spacing is $15 \times 2^n$ kHz and n is 10, the number of the additional symbols is at most 7.

2. The method of claim 1, further comprising:

transmitting, to the terminal, a signal including information indicating at least one of whether a complementary sequence is transmitted or a mapping relationship between the complementary sequence and information included in the complementary sequence, wherein the complementary sequence is located at samples from a first sample of the first slot for every 0.5 ms boundary to a sample before the additional symbol, or at a predetermined location based on the 0.5 ms boundary.

3. The method of claim 2, further comprising:

identifying control information to be transmitted to the terminal;

generating the complementary sequence corresponding to the control information; and transmitting the complementary sequence.

4. A method performed by a terminal of a communication system, the method comprising:

identifying a subcarrier spacing for a communication between a base station and the terminal;

receiving, from the base station, a signal including information indicating at least one of whether an additional symbol is allocated or a number of additional symbols, wherein the number of additional symbols is based on the subcarrier spacing;

receiving, from the base station, data allocation information for mapped data; and receiving, from the base station, the mapped data on the additional symbol based on the data allocation information, wherein the additional symbol is allocated to a predetermined part of a first slot for every 0.5 ms boundary, wherein in case that the subcarrier spacing is $15 \times 2^n$ kHz and n is 8, the number of the additional symbols is at most 1, wherein in case that the subcarrier spacing is $15 \times 2^n$ kHz and n is 9, the number of the additional symbols is at most 3, and wherein in case that the subcarrier spacing is $15 \times 2^n$ kHz and n is 10, the number of the additional symbols is at most 7.

5. The method of claim 4, further comprising:

receiving, from the base station, a signal including information indicating at least one of whether a complementary sequence is received or a mapping relationship between the complementary sequence and information included in the complementary sequence, wherein the complementary sequence is located at samples from a first sample of the first slot for every 0.5 ms boundary to a sample before the additional symbol, or at a predetermined location based on the 0.5 ms boundary.

6. The method of claim 5, further comprising:

receiving, from the base station, the complementary sequence;

identifying correlations between a plurality of sequences and the complementary sequence; and identifying control information corresponding to a sequence corresponding to the highest correlation among the identified correlations.

7. A base station of a communication system, the base station comprising:

a transceiver; and a controller configured to:

identify a subcarrier spacing for a communication between the base station and a terminal, transmit, to the terminal, a signal including information indicating at least one of whether an additional symbol is allocated or a number of additional symbols, wherein the number of additional symbols is based on the subcarrier spacing, generate data allocation information for mapping data based on the allocation of the additional symbol, and transmit, to the terminal, the data allocation information and the mapped data, wherein the additional symbol is allocated to a predetermined part of a first slot for every 0.5 ms boundary, wherein in case that the subcarrier spacing is $15 \times 2^n$ kHz and n is 8, the number of the additional symbols is at most 1, wherein in case that the subcarrier spacing is $15 \times 2^n$ kHz and n is 9, the number of the additional symbols is at most 3, and wherein in case that the subcarrier spacing is $15 \times 2^n$ kHz and n is 10, the number of the additional symbols is at most 7.

8. The base station of claim 7, wherein the controller is further configured to transmit, to the terminal, a signal including information indicating at least one of whether a complementary sequence is transmitted or a mapping relationship between the complementary sequence and information included in the complementary sequence, wherein the complementary sequence is located at samples from a first sample of the first slot for every 0.5 ms boundary to a sample before the additional symbol, or at a predetermined location based on the 0.5 ms boundary.

9. The base station of claim 8, wherein the controller is further configured to identify control information to be transmitted to the terminal, generate the complementary sequence corresponding to the control information, and transmit the complementary sequence.

10. A terminal of a communication system, the terminal comprising:

a transceiver; and a controller configured to:

identify a subcarrier spacing for a communication between a base station and the terminal, receive, from the base station, a signal including information indicating at least one of whether an additional symbol is allocated or a number of additional symbols, wherein the number of additional symbols is based on the subcarrier spacing, receive, from the base station, data allocation information for mapped data, and receive, from the base station, the mapped data on the additional symbol based on the data allocation information, wherein the additional symbol is allocated to a predetermined part of a first slot for every 0.5 ms boundary, wherein in case that the subcarrier spacing is 15×2ⁿ kHz and n is 8, the number of the additional symbols is at most 1, wherein in case that the subcarrier spacing is $15 \times 2^n$ kHz and n is 9, the number of the additional symbols is at most 3, and wherein in case that the subcarrier spacing is $15 \times 2^n$ kHz and n is 10, the number of the additional symbols is at most 7.

11. The terminal of claim 10, wherein the controller is further configured to:

receive, from the base station, a signal including information indicating at least one of whether a complementary sequence is received or a mapping relationship between the complementary sequence and information included in the complementary sequence, wherein the complementary sequence is located at samples from a first sample of the first slot for every 0.5 ms boundary to a sample before the additional symbol, or at a predetermined location based on the 0.5 ms boundary.

12. The terminal of claim 11, wherein the controller is further configured to:

receive, from the base station, the complementary sequence, identify correlations between a plurality of sequences and the complementary sequence, and identify control information corresponding to a sequence corresponding to the highest correlation among the identified correlations.

\* \* \* \* \*